United States Patent [19]
Cuk et al.

[11] Patent Number: 5,442,534
[45] Date of Patent: Aug. 15, 1995

[54] ISOLATED MULTIPLE OUTPUT CUK CONVERTER WITH PRIMARY INPUT VOLTAGE REGULATION FEEDBACK LOOP DECOUPLED FROM SECONDARY LOAD REGULATION LOOPS

[75] Inventors: Slobodan Cuk, Laguna Hills; Ljubisa Stevanovic, Pasadena, both of Calif.

[73] Assignee: California Institute of Technology, Pasadena, Calif.

[21] Appl. No.: 21,841

[22] Filed: Feb. 23, 1993

[51] Int. Cl.[6] ............................................ H02M 3/335
[52] U.S. Cl. ...................................................... 363/16
[58] Field of Search ...................... 363/16, 20, 21, 40, 363/106, 110

[56] References Cited

U.S. PATENT DOCUMENTS 4,184,197  1/1980  Cuk et al. ............................. 363/16

OTHER PUBLICATIONS

A. Dauhajre and R. Middlebrook, "A Simple PWM-FM Control for an Independently Regulated Dual Output Converter," Proc. Tenth International Solid-State Power Electronics Conference (Powercon 10) Mar. 1983.

R. Mahadevan, et al., "A Converter with Three Switched-Networks Improves Regulation, Dynamics and Control," Proc. Tenth International Solid-State Power Electronics Conference (Powercon 10), pp. E1.1–E1.19, Mar. 1983.

H. Matsuo and F. Kurokawa, "Precise Regulation of Multiple Output Voltages in a DC-DC Converter," IEEE PESC Record, 1980, pp. 275–283.

*Primary Examiner*—Thomas M. Dougherty
*Assistant Examiner*—E. To
*Attorney, Agent, or Firm*—Antonio M. Fernandez

[57] ABSTRACT

A novel isolated, capacitive idling, Ćuk switching-mode converter features two separate nonisolated feedback loops, one on the primary side to regulate against input voltage changes and the other on the secondary side to regulate against load current changes only. While preserving cost, size and simplicity of conventional multiple output switching-mode converters, the new converter and feedback control approach offers the advantages of simple feedback control implementation due to elimination of isolation requirements in the feedback control circuits, simultaneous regulation of all output voltages from no load to full load, and greatly improved bandwidth and step-load transient response. For operation from a rectified ac line, feedback control on the input to the transformer is modified to force the average input current to follow the full-wave rectified ac line voltage for unity power factor (UPF) performance on the input and wide bandwidth voltage regulation on the output. Both are demonstrated simultaneously in a single, isolated, multiple ac-to-dc switching-mode power converter. The novel decoupled feedback control is shown to be equally applicable to a number of Ćuk-type converter topologies featuring capacitive energy transfer from a voltage source to a load.

10 Claims, 21 Drawing Sheets

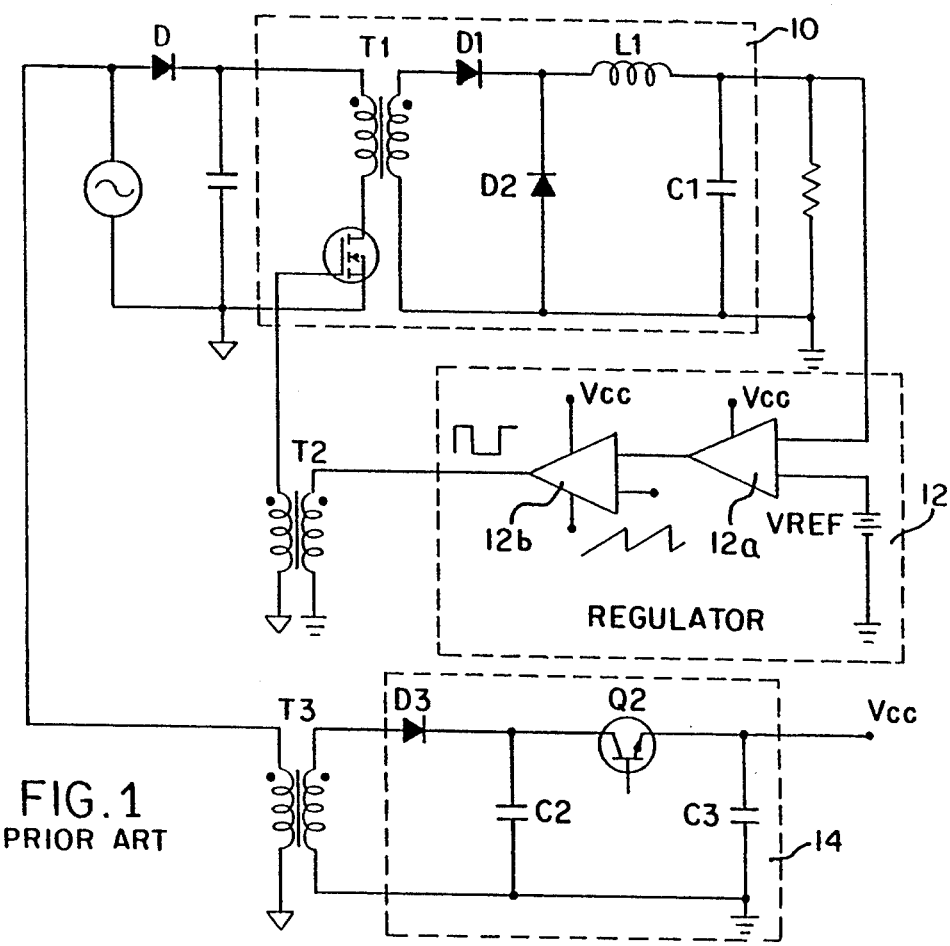
FIG.1 PRIOR ART
FIG.2 PRIOR ART
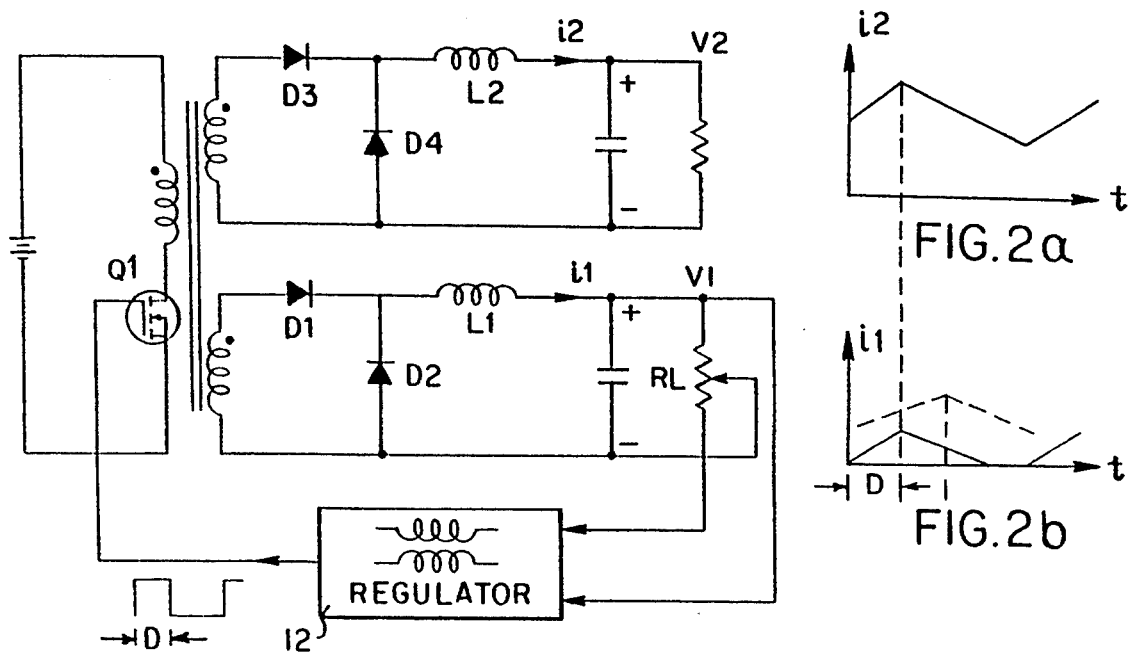

ISOLATED MULTIPLE OUTPUT CUK CONVERTER WITH PRIMARY INPUT VOLTAGE REGULATION FEEDBACK LOOP DECOUPLED FROM SECONDARY LOAD REGULATION LOOPS

FIELD OF THE INVENTION

This invention relates to a dc-to-dc switching-mode converter having an isolation transformer and regulated multiple output voltages and to ac-to-dc converters with input current shaping for unity power factor operation.

BACKGROUND ART

Modern switching-mode converters for power supplies, such as those used in personal computers and other electronic equipments are plagued by many practical problems.

First, for safety and other reasons, an isolation transformer is required in the power processing stage of the converters, which then requires an isolation transformer in the feedback control circuit leading to major circuit complexity and cost.

Second, for cost and size reasons, multiple output converters are preferred in a majority of practical applications to supply multiple voltages, such as +5 V, +12 V, and −15 V in a single converter. However, only one of the output voltages can be fully regulated, while the others cannot.

In addition, the load currents cannot be allowed to drop below certain minimum values (typically 15% of the full load value) without drastically affecting unregulated multiple output voltages. A typical solution to this problem has been to waste 15% of excess power by placing a resistor in parallel with the output load in order to maintain multiple outputs within prescribed tolerances.

Yet another problem is to shape the input current to follow the ac power line current in the power processing input stage of the converters for unity-power factor operation to avoid pollution of utility power lines with harmonic currents. Typically unity-power factor operation is obtained by use of an additional front-end switching-mode regulator, which increases both the size and cost of the power processing stage and decreases the power processing efficiency.

The nature of these practical problems is discussed more fully below with reference to FIGS. 1 through 5 using conventional switching-mode converters as examples.

A typical prior-art isolated switching-mode converter shown in FIG. 1 consists of an isolated power stage 10 and an integrated circuit (IC) feedback regulator 12, where the necessary regulation is effected. However, since the only controllable device, a switching transistor Q1, is on the primary side of an isolation transformer T1, the feedback circuit must also be isolated by a transformer T2. The single feedback regulator 12 comprises a voltage comparator 12a which compares the output voltage to a load with a reference voltage VREF, and a voltage comparator 12b which compares the error voltage from the comparator 12a with a sawtooth wave voltage generated at, for example, 20 kHz clock rate to produce a pulse width modulated (PWM) control signal to the switch Q1.

single integrated circuit (IC) regulator chips are commercially available from a number of manufacturers which perform all of the functions of the feedback regulator 12. Later figures include only the functional description of such a regulator chip in nonisolated feedback control circuits of this type.

The ac input line voltage is rectified by a full-wave diode rectifier shown for simplicity in the drawing as a single diode D but is in practice implemented with a diode bridge circuit. The rectified voltage is filtered by a capacitor C. The isolated switching-mode converter 10, comprising switching diodes D1 and D2 and inductive filter elements L1 and C1, is a conventional buck converter.

The feedback regulator 12 controls only one quantity, the duty cycle of the switching transistor Q1 on the primary side of the isolation transformer T1 Thus, both input voltage variations and output load current changes are absorbed by controlling the duty ratio of the single input switching transistor Q1.

The complexity of the circuit needed to implement isolation in the feedback loop is obvious from FIG. The control circuit on the secondary side of the isolation transformer T1 requires power, which is obtained from either a separate isolated switching-mode converter (not shown) or through a third, low power, isolation transformer T3 and a conventional linear power supply regulator 14 operated from the ac input line. However, the controlling switching transistor Q1 on the primary side of the isolation transformer then requires an isolation transformer T2 in the feedback loop. Thus, the need for some protection features on either side of the main isolation transformer T1 increases the number of isolation transformers to three because the linear power supply 14 required to provide regulated VCC for the feedback circuit 12 requires an additional isolation transformer.

As shown in FIG. 2, in multiple output converters, the single feedback control regulator 12 permits the full regulation of only the one output voltage shown in FIG. 1. The other output voltage can, depending on the load current, undergo very large variations from +12 V nominal value to as low as +6 V, or as high as +18 V, which is clearly unacceptable. The typical prior-art solution to this problem is to preload both outputs with some minimum 15% load current by use of dummy resistors in parallel with the load shown in FIG. 2 as being a variable resistor.

If the load RL in the main converter varies, as illustrated in FIG. 2, the output current i1 to the load varies, as shown by the dotted line in the graph of FIG. 2a, but the average voltage output to the load is maintained through the PWM of the duty cycle D to the switching transistor Q1 as intended. However, that change in duty cycle of the switch will then also have an effect on the output current to the load of the second of the multiple output converter. If, on the other hand, the load of the other of the two multiple outputs varies as shown in FIG. 3, it will be virtually unregulated as shown in FIG. 3, i.e., the duty cycle D is virtually unchanged, as will be understood more fully from further discussion below. While that technique of providing both outputs with some minimum 15% load current will alleviate the voltage regulation problem, it continuously wastes 30% of power and thus defeats the original purpose of using higher efficiency switching-mode regulators over linear-mode regulators.

Full load current regulation on multiple output voltages could, of course, be obtained as shown in FIG. 4 by use of the cascaded switching postregulators 16 and 18.

Efficiency is reduced significantly since the total input power is processed twice, once in the main multiple-output switching-mode regulator 10' and the second time through the postregulators 16 and The size, weight and cost of the power-supply package is thus increased significantly.

Several important performance observations could be made with reference to the isolated Cuk converter 20 as disclosed in U.S. Pat. No. 4,184,197 and illustrated in FIG. 5. In this, as in all switching-mode converters used so far, the existence of the single controllable switching transistor Q on the primary side and the controlled converter 20 necessitates at least one level of isolation in the feedback circuit 22 for control of the output dc voltage on the secondary side. In practice, the isolation barrier is crossed many more times, such as in providing VCC for the feedback circuit. Note that the single active switch Q on the primary side performs a dual function, as in other switching dc-to-dc converters shown in FIGS. 1 and 2. Its pulse width is modulated to regulate against both the changes of input voltage and changes of output load current. Note also that of the two disturbances, input voltage variation has a more significant first order effect on duty ratio D, while load current changes cause only a small second order correction in the duty ratio.

For example, from the ideal voltage conversion gain $(D/(1-D))$ without parasitic resistances, a 4 to 1 input voltage change (15 V to 60 V) may cause duty ratio change from 0.2 to 0.5 or 250% change. When the parasitic resistances are included in the voltage conversion ratio, the load current change by a factor of 10 (from 9% to 90% of load) typically may cause only 10% or less change of nominal duty ratio (from 0.5 to 0.55). The more efficient the converter, the smaller the needed duty ratio corrections for load current regulation. One motivation for the present invention is to separate the two disturbances by keeping the input voltage disturbance localized on the primary side of the isolation transformer T1 shown in FIG. 1 and load current disturbances localized on the secondary side of the isolation transformer T2 and thus eliminate the need for the isolation in the feedback control circuit.

Without such separation, the dynamic response and bandwidth of the original fourth order converter, such as the one in FIG. 5 is severely limited resulting in a poor transient performance to a step-load current change. In addition to the nonminimum phase response (right half plane zero's) the converter corner frequency is strongly dependent on the operating duty ratio D as discussed in S. Cuk and R. D. Middlebrook, *Advances in Switched-Mode Power Conversion*, Vols. I, II, and III, TESLAco, Irvine, Calif., 1981 and 1983 editions. Consequently, the loop-gain cross-over of the converter in FIG. 5 or other standard converters, such as the forward converter with an input filter shown in FIG. 4, has to be chosen at conservatively low frequencies in order to meet worst-case conditions.

Two approaches have been proposed in the past which provided a full-load regulation of multiple outputs puts in a single power conversion stage. The first approach described in A. Dauhajre and R. D. Middlebrook, *A Simple PWM-FM Control for an Independently Regulated Dual Output Converter*, Proc. Tenth International Solid-State Power Electronics, Conference (Powercon 10), March 1983, was based on a two-output flyback converter with one output operated in a discontinuous conduction mode, hence sensitive to switching frequency. The full regulation of both outputs was provided by controlling two quantities, duty ratio and the switching frequency of the single active device on the primary side. This method is clearly limited to two outputs and requires isolation in the feedback control circuit.

Another approach is to use additional active switches in each of the secondary converter sides of an isolation converter, such as the three-switch network (3SN) extension of the isolated Ćuk converter proposed in R. Mahadevan, S. E1-Hamamsy, W.M. Polivka and S. Cuk, *A CONVERTER WITH THREE SWITCHED-NETWORKS IMPROVES REGULATION, DYNAMICS, AND CONTROL*, Proc. Tenth International Solid-State Power Electronics Conference (Powercon 10), pp. E1.1–E1.19, March 1983, and shown in FIG. 6. Note the additional pair of switches, Q1, D1 and Q2, D2 in each output section of the multiple output voltage regulator. As shown, each of the two outputs can be independently and fully controlled by independent PWM control signals q1 and q2. In waveforms shown in FIGS. 19 6a, which is equivalent to waveforms shown in FIG. 19 Mahadevan, et al., the arrows on the two drive waveforms for switches q1 and q2 indicate that these edges are controllable. Note the wide range of change of both duty ratios d1 and d2. Note also, that according to the control strategy proposed in Mahadevan, et al., supra duty cycle d of the PWM signal applied to the transistor Q on the primary side is constant, and its ability to vary is not utilized. Hence, both input voltage and load current variations are compensated by controlling the duty ratio of active devices only on the secondary winding side of the isolation transformer T. Thus, the same dynamic response deficiencies and suboptimal step-load transient response remains. Furthermore, as illustrated in Mahadevan, et al., supra if the active device on the primary side is PWM modulated, it is controlled from the additional, standard, secondary-side output as shown in FIG. 28 in Mahadevan, et al., supra so that isolation in the feedback control is also needed.

A modification of the prior art in accordance with the present invention is to separate the conventional isolated feedback control loop of FIG. 5 into multiple, nonisolated feedback loops, one on the primary side of the isolated 3SN-Ćuk converter of FIG. 6 for feedback regulation of the input voltage and the others for regulation of the multiple output voltages on its secondary side of the isolation transformer T. Thus, the beneficial decoupling of the input voltage regulation from the output load regulation is achieved, and each output voltage may be controlled by controlling the duty cycles d1 and d2 of the added third switches Q1 and Q2. The primary-side feedback loop regulates against input voltage variation, while the secondary-side feedback loops perform additional minor output voltage corrections against load current changes. This feedback decoupling is only possible on a very limited number of switching-mode converter topologies such as the 3SN-Ćuk converter shown in FIG. 6.

In addition to elimination of the isolation in the feedback control, the invention to be described below provides full regulation of all output voltages in a single power processing stage while preserving the efficiency, small size, and low cost of the isolated Ćuk converter disclosed in U.S. Pat. No. 4,184,197. Other switching-mode converters that may embody the present invention will then be described and illustrated in the drawings.

In ac-to-dc switching converters such as the one in FIG. 1, the conventional front-end, full-wave rectifier and filter provides raw dc input power which must be further processed by the dc-to-dc switching converter. The front-end, full-wave rectifier and filter has a very poor power factor and is a source of the severe harmonic currents. Recent international regulations governing power quality and harmonic current pollution of the utility line have imposed severe harmonic current limitations on equipment connected to the ac power line. Consequently, to avoid introducing harmonic currents in the line, it is desirable to operate a switching-mode converter with a unity power factor (UPF).

The standard way to achieve UPF operation is to process the input power as shown in FIG. 7 through a preliminary power processing stage 30, typically a boost converter which provides UPF control. The addition of this front-end preprocessing power stage further decreases efficiency and increases the size and cost of the converter package. It would be desirable to achieve UPF operation with only an appropriate modification of the input voltage regulation feedback loop in a single power processing stage. The present invention provides UPF operation in that manner without any penalty in efficiency, size, cost, or performance (fast output transient response), since UPF operation is obtained only through a change of the input feedback control loop of the single power processing stage of the converter which may be a multiple output voltage converter, each with its own direct feedback voltage control loop.

SUMMARY OF THE INVENTION

In accordance with the present invention, all of these practical problems are obviated by use of the isolated version of the dc-to-dc Ćuk converter disclosed in U.S. Pat. No. 4,184,197 appropriately modified as described below to incorporate two separate nonisolated feedback loops, one on the primary side of an isolation transformer and the other on the secondary side of the transformer. The isolated Ćuk converter comprises a primary-side closed loop circuit consisting of an input dc voltage source, an input inductor, an energy transfer capacitor, and a transformer primary winding connected serially, and in that order, and a primary-side switching means connecting a junction between the inductor and capacitor on the primary winding side of the transformer to the juncton between the primary winding and the return current side of the source, and a secondary-side closed loop circuit comprising the transformer secondary winding, an energy transfer capacitor, output inductor, and a load connected serially and in that order, and a switching means connecting the junction between the capacitor and the inductor on the secondary winding side of the transformer to a junction between the load and the return current side of the secondary winding of the transformer. The primary-side switching means is typically implemented using an active controllable device such as a bipolar transistor or MOSFET, Q, while the secondary-side switching means comprises a diode, D, whose switching is controlled through the primary-side active device switching, and in synchronism therewith. The primary- and secondary-side capacitors clearly exhibit two distinct intervals: a discharging interval when the input switch Q is ON and the output switch is OFF and a charging interval in the opposite case.

The isolated Ćuk converter is then modified on the secondary side by inclusion of an additional active current bidirectional switch, Q1, in series with the secondary-side capacitor introducing an additional secondary-side control device. Opening of this bidirectional switch Q1 introduces an idling interval in the previous discharge and charge intervals of the squarewave-like energy (current) transferring capacitor. By varying the width of this idling interval (during which capacitor current is zero), an additional independent control over the output voltage is introduced. When this switch is implemented with a MOSFET, its body diode provides it with the bidirectional current capability. Both active devices Q and Q1 are, for simplicity of implementation, turned ON simultaneously, but are turned OFF at different times, resulting in two independent duty ratio controls, d of Q and d1 of Q1, affecting the output dc voltage.

Thus, in the context of the present invention, this particular switching configuration permits establishing two separate and completely decoupled nonisolated feedback loops so that the primary feedback loop regulates against the changes of the input voltage by controlling the duty ratio d of the primary-side active switch Q, while the secondary-side feedback loop regulates against changes of the load current by controlling the duty ratio d1 of the secondary-side active switch Q1. A constant output voltage is thus maintained even in the case of a light load when the converter enters discontinuous conduction mode owing to the complete decoupling of the two controls. Hence, regulation from no load to full load is accomplished. The feedback sensing voltage for the secondary-side feedback control is clearly the output voltage which is to be regulated. It is shown that the appropriate sensing voltage for the primary-side feedback circuit can be found on the primary side of the transformer as the voltage across the primary-side switching device during its OFF state. This feedback control configuration eliminates the isolation requirement imposed on all conventional feedback control configurations.

Finally, it is desirable for practical reasons to synchronize the operation of the primary- and secondary-side IC feedback regulators which operate at constant switching frequency. This is accomplished by sensing and differentiating the transformer secondary-side voltage, and gating only pulses of one polarity through a diode to the sync input of the secondary-side IC feedback regulator. In this way, the two active devices, Q and Q1, will be simultaneously turned ON and synchronized to a fixed common clock rate.

Additional regulated output voltages can be easily provided by repeating the secondary-side 5 circuit as many times as desired, once for each regulated voltage added. Since each output voltage has now its own controlling active switch and regulating feedback circuit, every output voltage will be independently and fully regulated from no load to full 0 load current change, and over a wide range of input voltage change. Each output voltage is also independently protected and could be shut OFF in case of a short or overload condition on that particular load without affecting the operation of the remaining 5 output voltages which could continue their service without interruption.

With input voltage regulation thus isolated from the secondary-side load current regulation feedback loops in the capacitive idling and isolated Ćuk dc-to-dc switching-mode converter, unity power factor operation is achieved when the dc-to-dc converter is connected to an ac power line by a full-wave rectifier and the primary-side feedback circuit is modified to force the average input current to follow the rectified ac line voltage and be in phase with it. This is IC chips by use of feedback control techniques that are commercially available as specially designed chips for UPF control. Qualitatively new performance not available in conventional converter circuits is obtained: ideal unity power factor performance and full regulation of all output voltages with a wide bandwidth is achieved simultaneously in a single-power converter which otherwise would require up to three separate cascaded power converter stages.

The foregoing summary is directed to practicing the invention in a preferred embodiment using an isolated Ćuk converter, however, it is understood that in its broadest aspects, the invention may be practiced in a number of different isolated switching-mode dc-to-dc converters that meet several special requirements. A number of new converter topologies suitable for implementation of this novel feedback decoupling control of switching converters is also disclosed as part of this invention. The isolated dc-to-dc converter suitable for this application must have an energy transferring capacitor on the secondary side of the isolating transformer. Energy transferring capacitor is defined as a device which conducts squarewave-like charging and discharging current as distinct from a filtering capacitor in a lowpass LC filter application. An additional current bidirectional switching device (such as a MOSFET switching transistor, for example) is added in series with this capacitor, which introduces another controllable quantity, an idling time during which the capacitor is neither charging nor discharging and its current is zero. This additional controllable quantity enables introduction of two separate and completely decoupled, nonisolated feedback loops so that the primary feedback loop regulates via the control of the primary-side active device, against changes of input dc voltage while the secondary-side feedback loop regulates via the control of the secondary-side active device, against the changes of load current. The feedback sensing voltage for the secondary-side feedback is clearly the output voltage which is being regulated. It is also shown that the appropriate feedback sensing voltage for the primary-side feedback is found on the primary side of the capacitive energy transfer converters, such as in Ćuk, SEPIC, inverse SEPIC, etc., converters as the voltage across the primary-side switching device during its OFF state. This permits elimination of the isolation requirement imposed on all conventional regulating feedback circuits. Decoupled feedback control insures that all output voltages in multiple output converters will be fully regulated from no load to full load. Furthermore, the same synchronization method as employed for the preferred embodiment using an isolated Ćuk converter applies equally well in this general case.

Finally, as in the preferred embodiment using the Ćuk converter operated from a full-wave rectified ac line voltage, the very beneficial UPF operation can be obtained on the input. The previous input voltage feedback regulation circuitry simply needs to be replaced by the standard feedback control circuit utilized for UPF control and implemented using standard commercially available IC regulator chips for UPF control.

BRIEF DESCRIPTION OF THE DRAWINGS

FIG. 1 is a conventional switching regulator requiring at least two isolation transformers in the feedback and control circuits.

FIG. 2 is a conventional two-output forward converter with a single feedback control circuit. Light load on regulated output (FIG. 2b) reduces duty ratio and the voltage of the unregulated output (FIG. 2a).

DETAILED DESCRIPTION OF THE INVENTION

Figure 6:
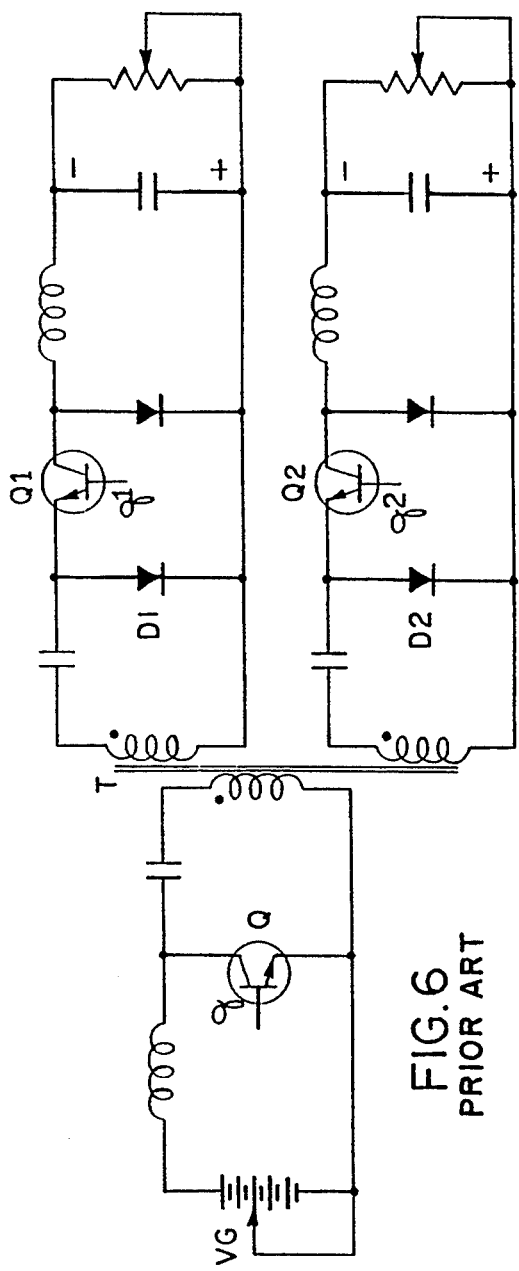
FIG. 6 is a prior-art two-output capacitive idling Ćuk converter.
Figure 6A:
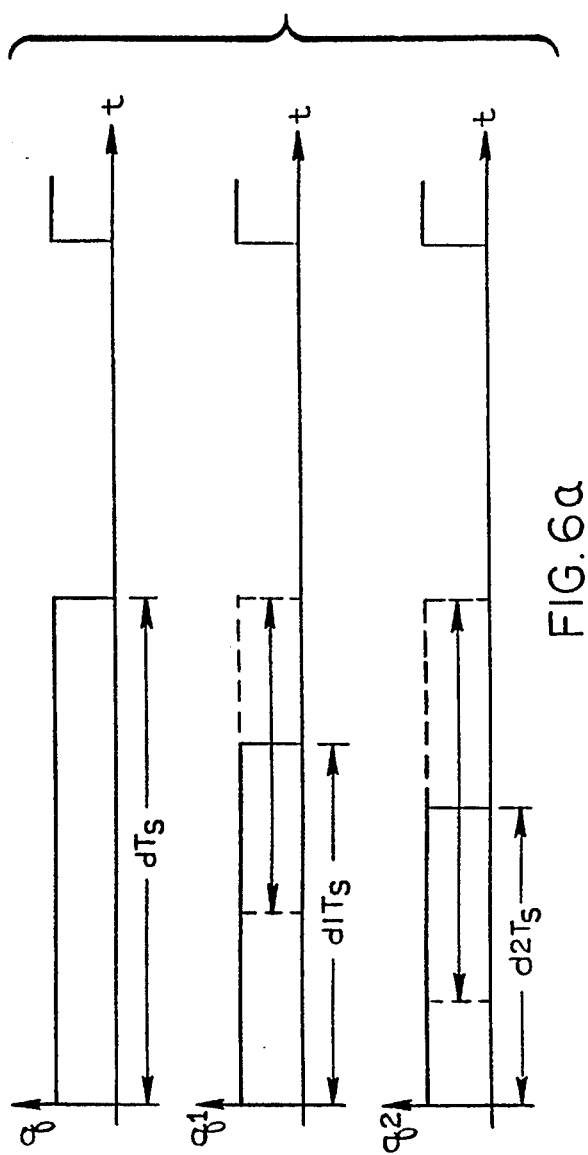
FIG. 6a illustrates duty ratios d1 and d2 of the secondary-side active switches are regulating against both input voltage change and load current change, since duty ratio d of the primary-side active switch is assumed constant.
Figure 8:
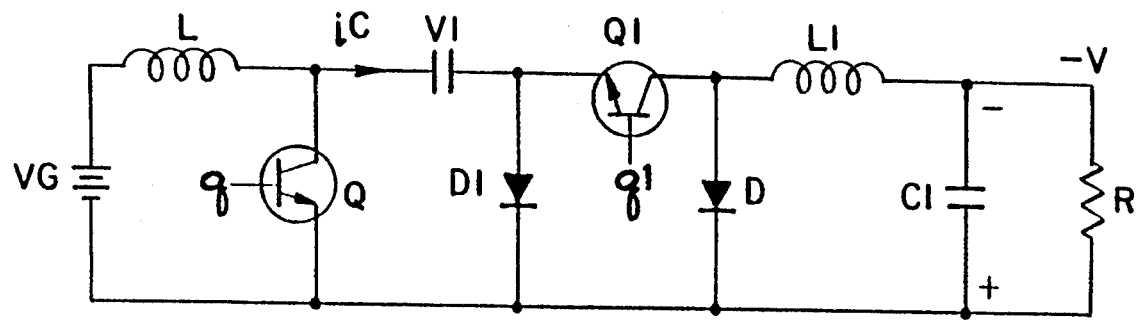
FIG. 8 is prior-art capacitive idling, nonisolated Ćuk converter using two independent controls.
Figure 8A:
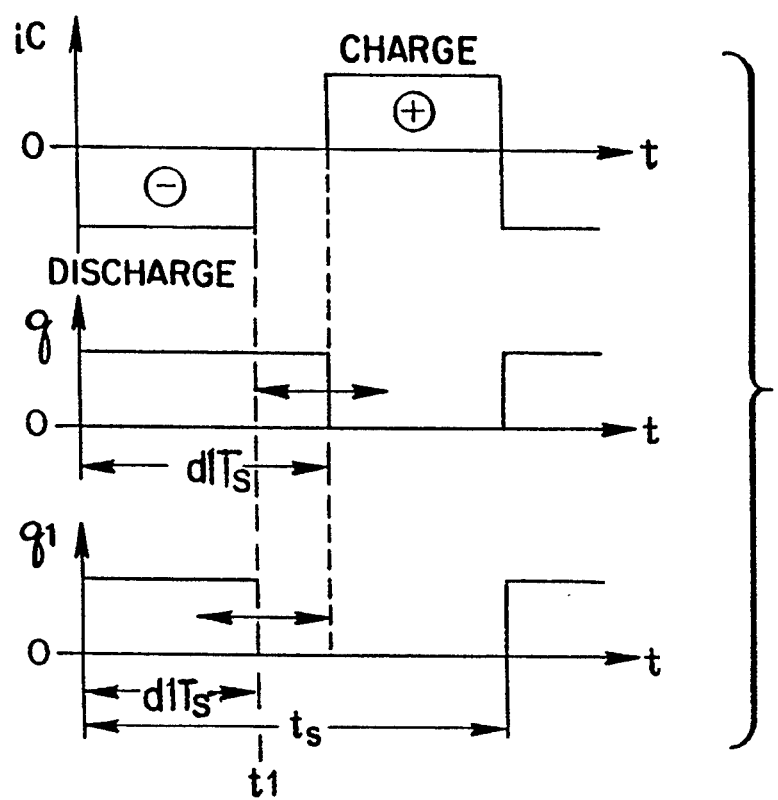
Figure 9C:
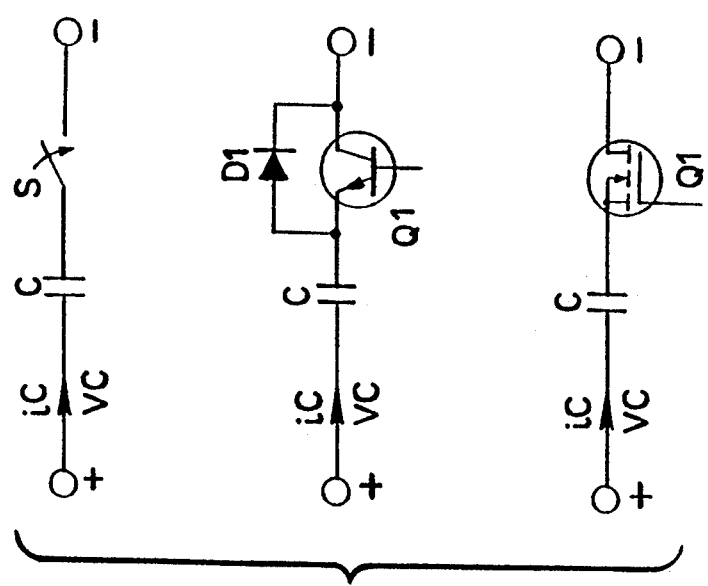
FIG. 9c shows two practical implementations of ideal current bidirectional switchs.
Figure 9B:
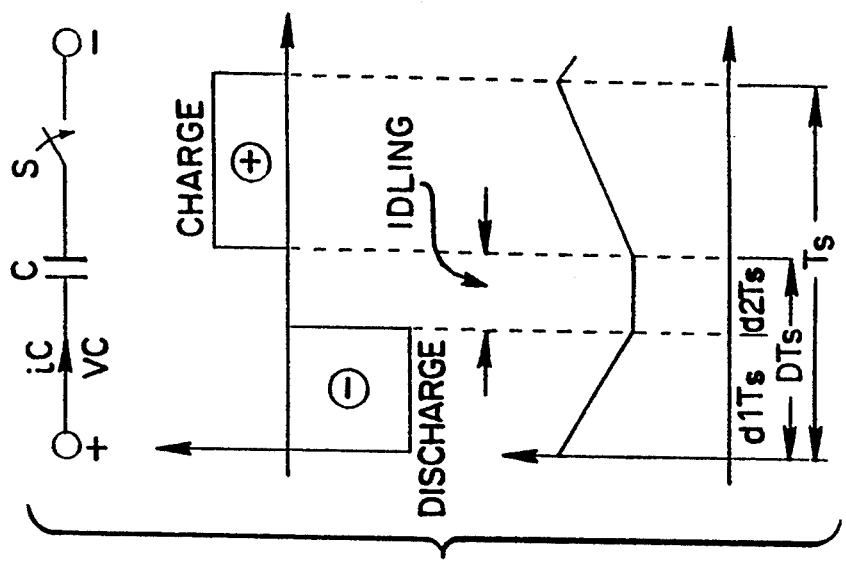
FIG. 9a illustrates the general concept of capacitive energy transfer. Addition of a current bidirectional switch as in FIG. 9b introduces an additional idling interval.
Figure 9A:
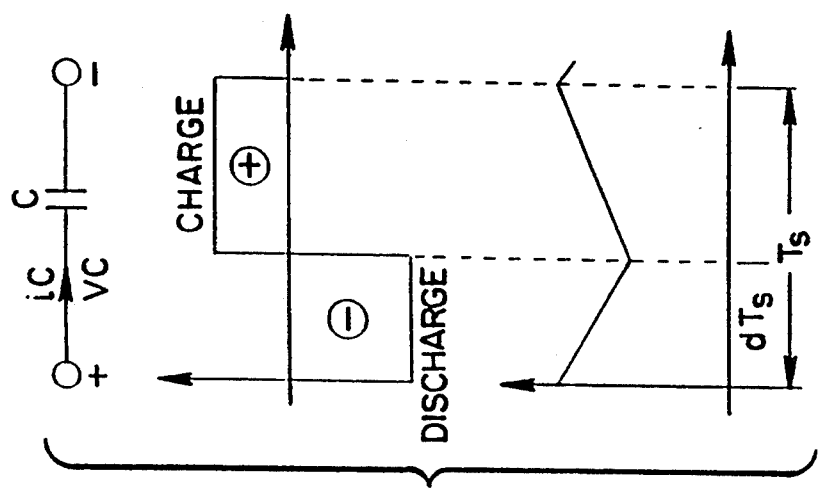

To understand how the isolated version of the basic dc-to-dc Ćuk converter has been improved to provide a new, useful and unobvious converter with decoupled input and output switching circuits having separate nonisolated feedback loops, application of the invention to the three switched network (3SN) extension of the basic Ćuk converter shown in FIG. 6 will first be described more fully with reference to FIG. 8. As explained in Ćuk, supra, the operation of this nonisolated 3SN converter is very similar to the original Ćuk converter, which is based on capacitive energy transfer. The only difference is introduction of an idling period ti= (d−d1) Ts as shown in FIG. 9b where d is the duty ratio of the transistor switch Q, d1 is the duty ratio of the diode switch D1, and Ts is the period of a clock cycle, typically a 20 kHz clock. During the idling interval ti, the energy transfer, capacitor C is neither charging nor discharging (open-circuited). Note that during this idling interval, capacitor voltage is constant and current through it is zero. Independent control of this idling interval is made possible by the presence of an additional pair of switches Q1 and D1 shown in FIG. 8 to implement the switch S in FIG. 9b. Position of these two switches is not unique, and FIG. 9c shows other bidirectional current switch implementations for the same converter. In one implementation the diode D1 is shown connected in parallel with a bipolar transistor switch Q1 to provide the same bidirectional current flow through the capacitor as in the arrangement of FIG. 9b. Another implementation in FIG. 9c is with just a MOSFET switch Q1 in place of the bipolar transistor Q1 and diode D1. The function of the diode D1 is served by the parasitic body diode of the MOSFET switch Q1. Assuming ideal switches Q1 and D1, both arrangements of FIGS. 8 and 10 result in the same three distinct linear switched networks of the 3SN capacitive idling illustrated in Ćuk converter of FIGS. 11a 11b and 11c and the same operation. Unlike discontinuous capacitor voltage mode in the conventional Ćuk converter, idling inteval d2Ts FIG. 11b is determined solely by the control input.

Figure 10:
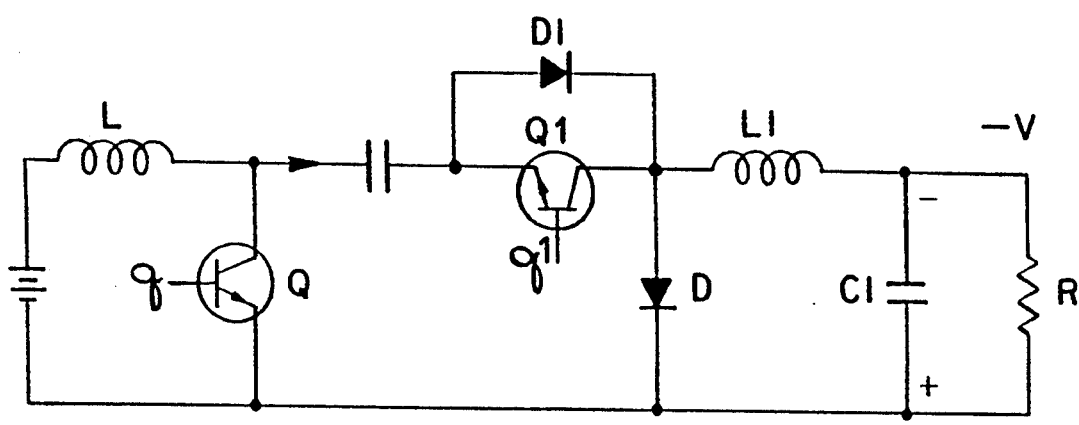
FIG. 10 is a capacitive idling Ćuk converter obtained by addition of a current bidirectional switch (Q1, D1) to the basic Ćuk converter. As in the boost-buck converter of FIG. 8, this results in two independently controllable switches (Q and Q1). As in FIG. 8a, FIG. 10a illustrates in three waveforms the periods of charge and discharge of an energy transfer capacitor C, and of two independent controls, q and q1.
Figure 10A:
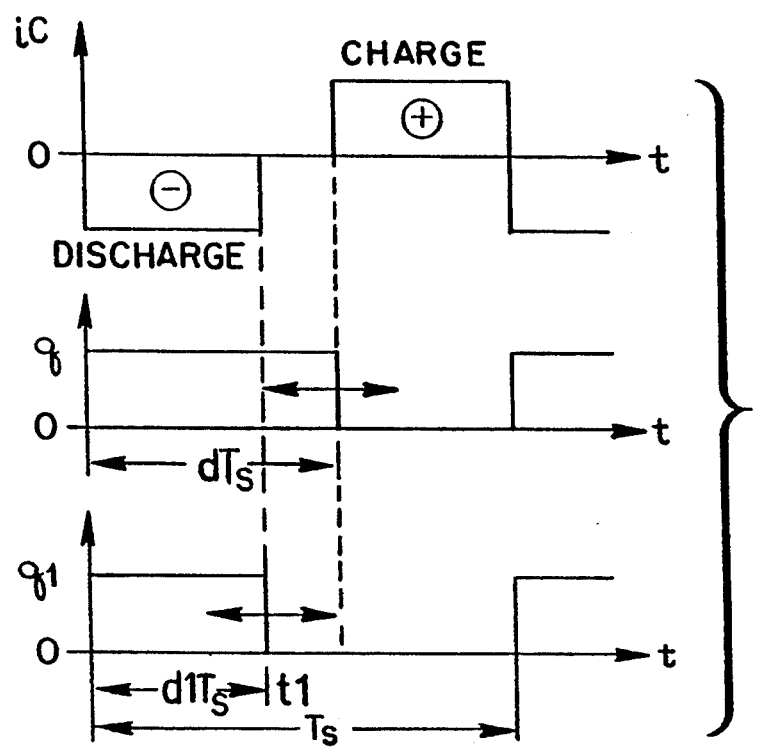
Figure 11A:
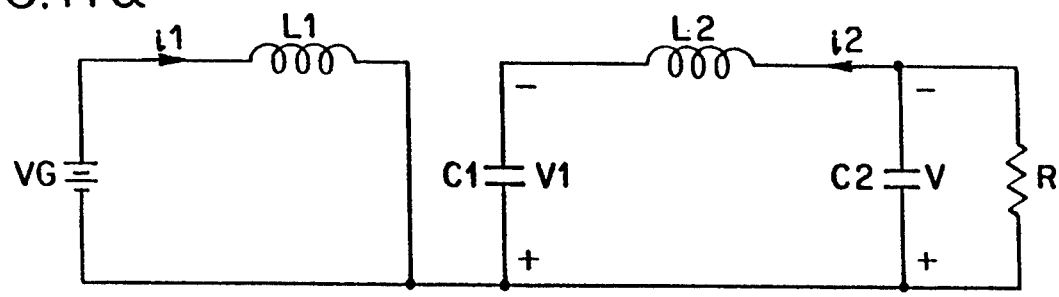
FIG. 11a, 11b and 11c are the three switched networks of the capacitive idling Ćuk converter illustrating the discharge, idle and charge intervals.
Figure 11B:
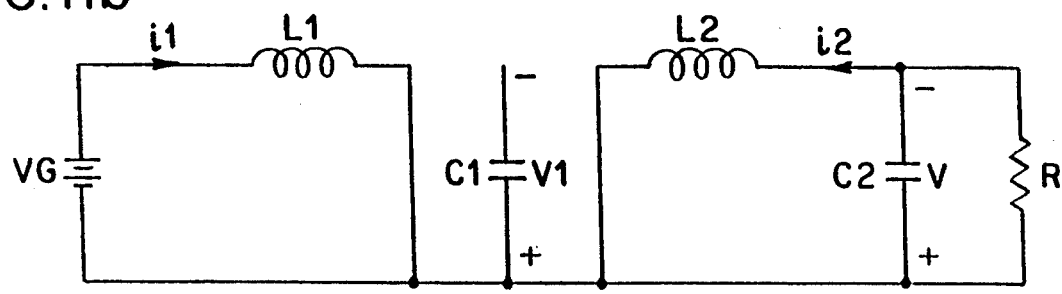
Figure 11C:
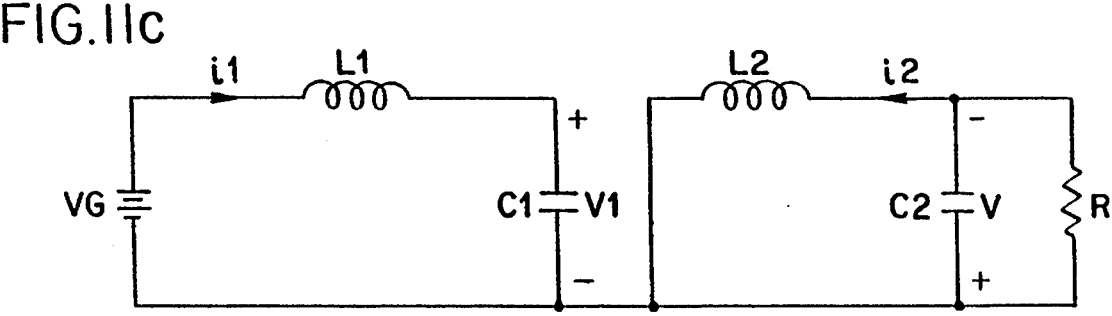

While somewhat less efficient than the previously known nonisolated 3SN converter (FIG. 8), this novel implementation of the 3SN Ćuk converter of FIG. 10 or its single MOSFET transistor implementation is independent of topology and provides a valuable insight into other converter configurations offering similar characteristics. Referring to FIG. 9b, it is obvious from the alternating capacitor current direction and its unidirectional voltage, that a current bidirectional switch is needed. The antiparallel connection of Q1,D1 (FIG. 9c) represents but one practical implementation of a general current bidirectional switch (equivalent to a single-pole, double-throw mechanical switch S) in series with the energy transferring capacitor C. The other implementation using a MOSFET transistor with its inherent diode (FIG. 9c) makes it clear how the series switch Q1 allows both charging and discharging currents through the capacitor C while also introducing the idling interval d2Ts by disconnecting one side of the capacitor from the rest of the circuit. Consequently, by inserting the current bidirectional switch in series with the energy transferring capacitor in other capacitive energy transfer converters, a special class of converters is obtained. Due to their common characteristic of energy transfer in the normal operation of the converter (Ćuk or other type) and the unique mode of capacitor idling (voltage constant and current zero) by opening a series-connected switch, the terminology capacitor idling converter is introduced and will be used hereinafter.

While the capacitive idling converter of FIG. 10 has two controllable switches, Q and Q1, it is not at all obvious that there exists a control method which would provide for a complete decoupling of the two expected disturbances, namely variations in the dc input voltage due to disturbances in the ac line voltage, and variations in the load which requires regulated voltage or voltages. To facilitate understanding how the present invention provides such complete decoupling, consider in FIG. 12 the straightforward cascaded connection of a boost converter 33 followed by a buck converter 32. The front-end boost converter has an output voltage V1 on capacitor C given by $$V1 = VG/(1-d), \qquad (1)$$

where d is duty ratio of a switch Q. The output voltage v of the buck converter is $$V = V1 \, d1 \qquad (2)$$

where d1 is the duty ratio of transistor Q1. The corresponding timing waveforms are as shown before in FIG. 10. It is clear that a feedback loop 33 can be closed around the input boost converter 31 to regulate the voltage V1 against input voltage changes only. A separate feedback loop 34 can be placed around the output buck converter in order to regulate the output voltage V against load current changes. Thus, the decoupling of the controls into the two feedback loops in the conventional boost-buck converter of FIG. 12 is easily understood.

Figure 12:
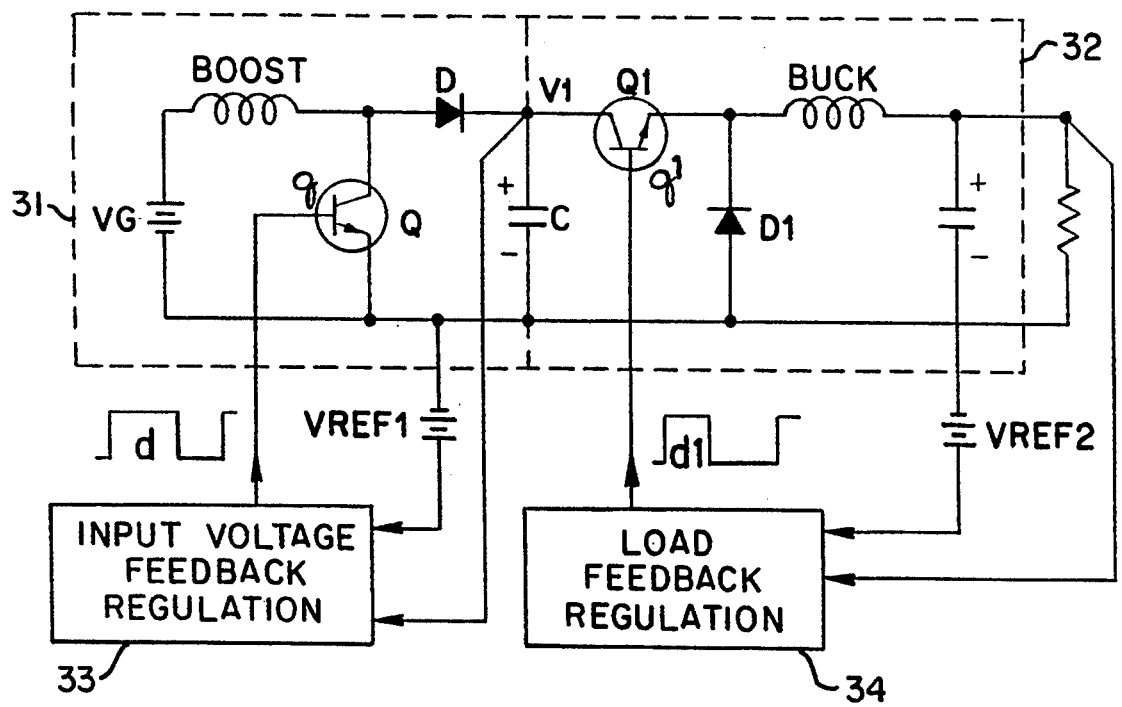
FIG. 12 is a conventional cascaded boost-buck converter with new useful and unobvious separate feedback loops around each converter.
Figure 13:
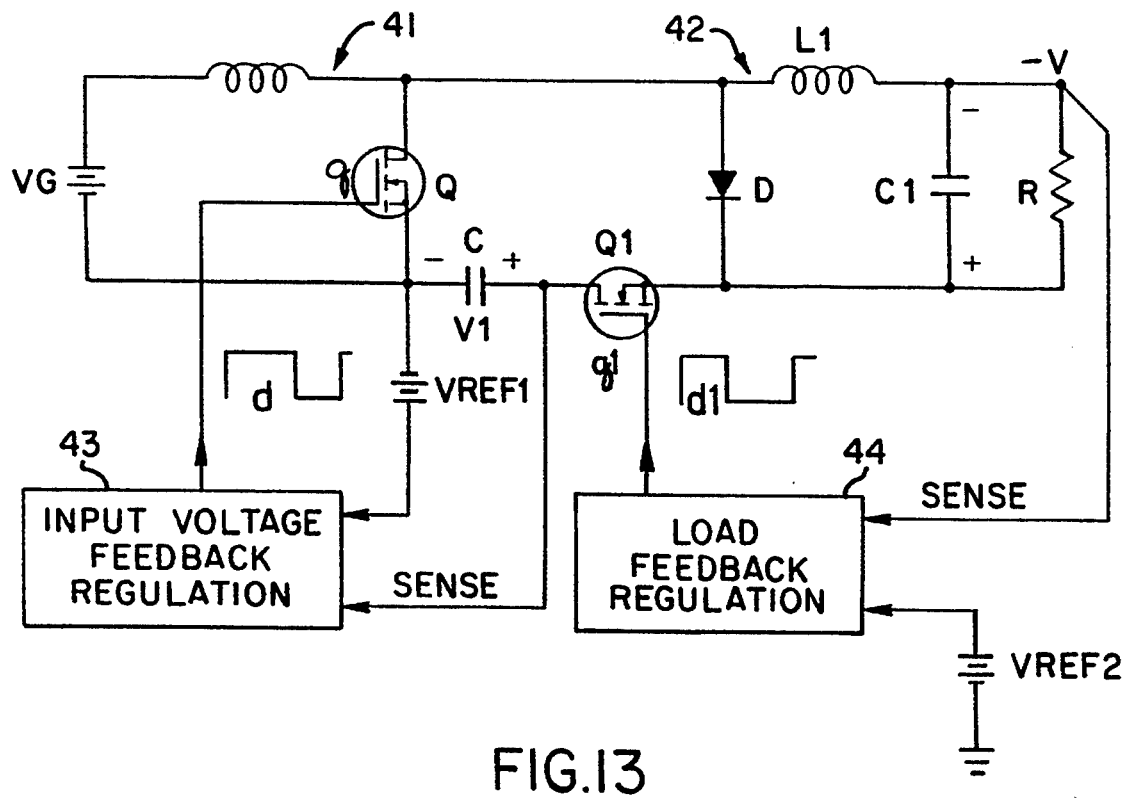
FIG. 13 is a capacitive idling Ćuk converter the topology of which is essentially equivalent to that in FIG. 10, but now featuring the same two feedback loops as the conventional boost-buck converter of FIG. 12.

The same new, useful and unobvious decoupling as illustrated in FIG. 12 may also be achieved in the 3SN Ćuk converter as shown in FIG. 13. Consider first the implementation of input voltage regulation in a capacitive idling cascaded boost buck converter as shown in FIG. 12 with the cascade connection of the boost-like converter 41 followed by the buck-like converter 42 as shown in FIG 8 but using MOSFET transistor switches. Except for the polarity inversion and particular switch realizations, the converter of FIG. 13 is equivalent to the cascaded boost-buck converter of FIG. 12. Therefore, a separate feedback loop 43 around the input boost-like power stage 41 can be closed for regulating against input voltage changes as shown in FIG. 12. Likewise, an output feedback loop 44 will regulate against load current changes. However, the key difference between that and the more important aspect of the present invention is in the isolated version of the capacitive idling Ćuk converter, as shown in FIG. 14.

No such isolation configuration is possible for the straightforward boost-buck converter of FIG. 12. In fact, the isolation transformer T in the capacitive idling Ćuk converter of FIG. 14 has the ideal true ac transformer characteristics. On the other hand, the new and very useful separation into the two feedback loops 43 and 44 of the nonisolated Ćuk converter in FIG. 13 carries over to the isolated capacitive idling Ćuk converter of FIG. 14. Consequently, the same reference numerals 43 and 44 are carried over from FIG. 13 to FIG. 14. The difference is that the isolation transformer T now completely separates the two feedback loops to their primary and secondary side circuit networks. This clearly eliminates the need for any isolation in the feedback control circuit, i.e., this allows the non-isolated feedback regulators to directly control and drive the active switches on the primary or secondary side, respectively. The standard IC regulator chips of the kind described earlier with respect to the feedback control circuit 12 in FIG. 1 can be implemented.

Figure 14:
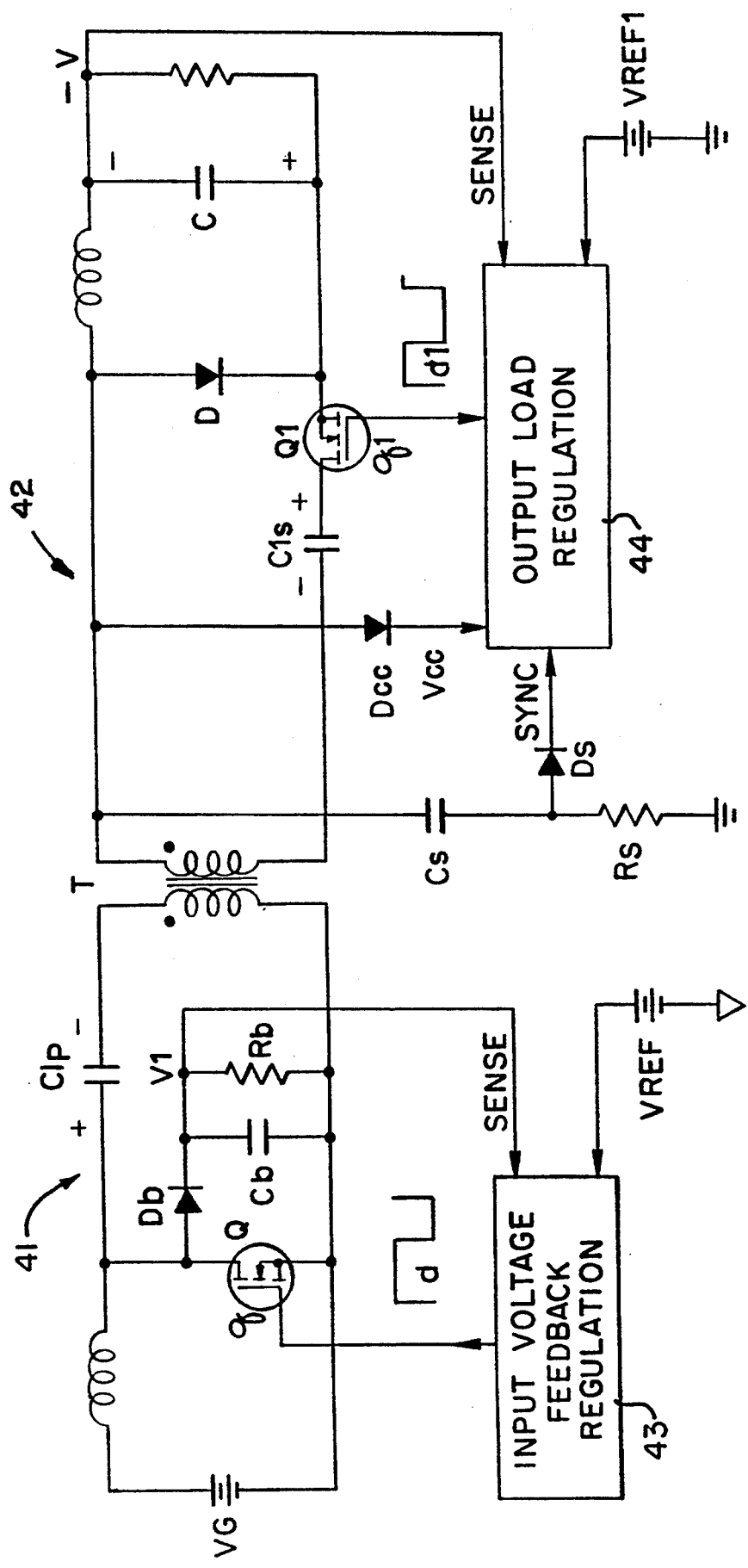
FIG. 14 is a the circuit diagram of the present invention: the isolated version of the capacitive idling Ćuk converter with nonisolated and decoupled primary- and secondary-side feedback control loops.

Referring to FIG. 14, the feedback loop 43 on the primary side regulates against input voltage changes, while the secondary side feedback loop 44 regulates against the output load current changes only. However, separation of these feedback loops is not possible in other standard converters, such as forward, push-pull, full-bridge, etc. The unique topology of the Ćuk converter and its capacitive idling extensions is that the quantity V1 given by Equation (1) which needs to be regulated by the input loop 43 is also available in a somewhat hidden form on the primary side. When the primary side transistor switch Q is OFF, its blocking voltage is equal to the total voltage V in the energy transferring capacitor Clp. Hence, all that is needed is to sense the transistor Q OFF voltage, rectify it into a dc voltage and use this as a sense voltage for the feedback loop 43 as shown in FIG. 14 using a diode Db, capacitor Cb and resistor Rb. Other methods for generating this sense voltage are also possible, such as creating an auxiliary boost converter by use of an extra diode and capacitor as signal processing components. The output feedback through the regulator 44 can be closed as before around the output stage as shown in FIG. 14.

Also shown in FIG. 14 is an Rs, Cs differentiating circuit for generating a synchronization pulse for the feedback loop at the transformer secondary from the squarewave generated at the primary side of the transformer when the transistor Q is turned ON. (A negative pulse produced by the Rs, Cs differentiating circuit at the transistor Q turn OFF time is blocked by a diode Ds.)

Figure 15:
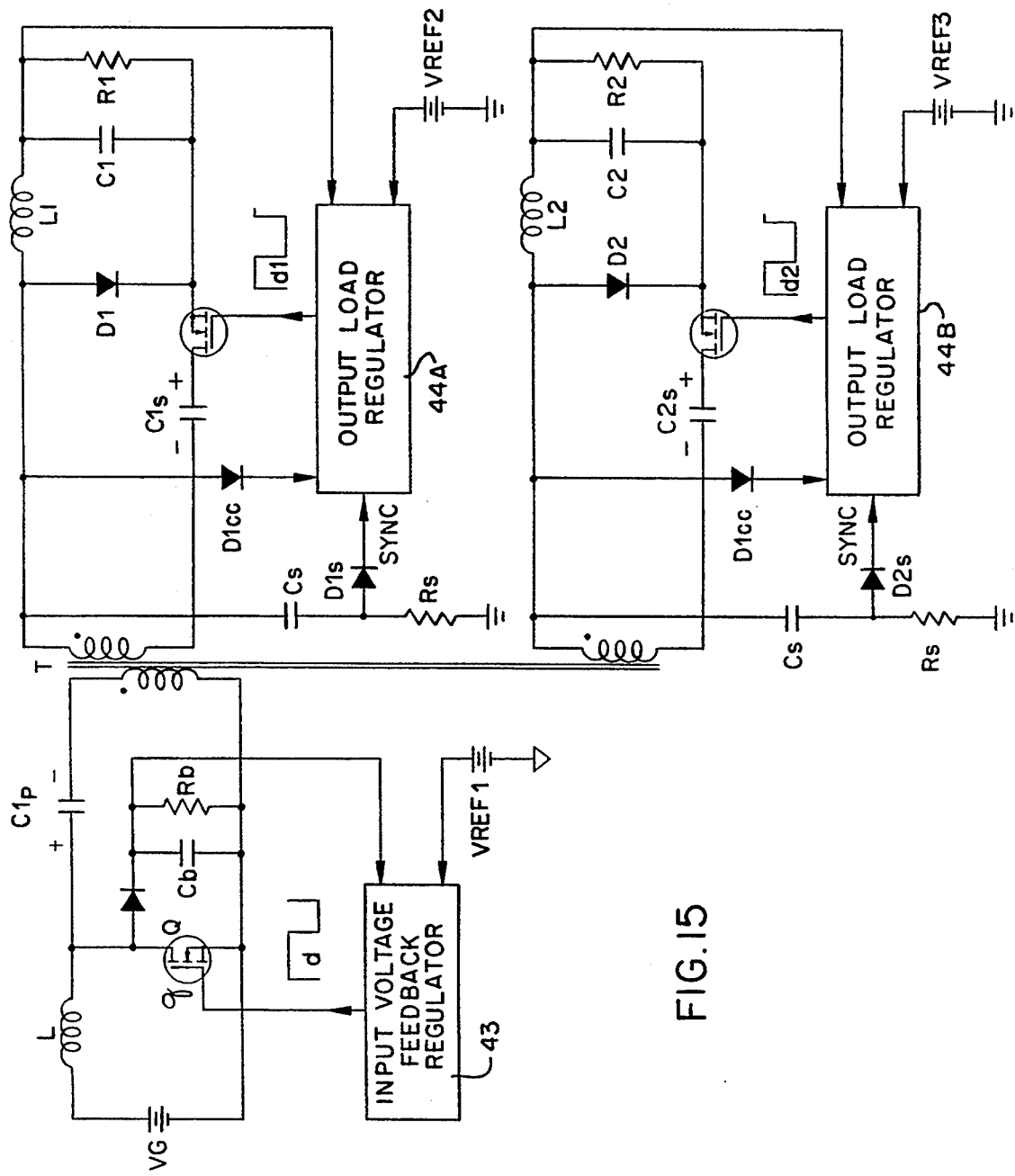
FIG. 15 is the two-output version of the present invention of FIG. 14. Each output feedback loop regulates against the load current changes of the respective outputs. The primary-side feedback loop regulates against input voltage changes.

Another important practical variant of the present invention is the two-output extension illustrated in FIG. 15. Note that each output can now have independent load regulation control, thus providing a full regulation of all outputs simultaneously and over the full load range from full load to no load. This was not possible with any of the standard converter topologies without great sacrifice in efficiency, size and cost.

The presence of a controllable, secondary-side switches Q1, Q2 in series with each output load R1, gives an additional practical advantage of this converter class. A short-circuit condition on one output circuit does not requires a shut down of the whole converter to protect it. Instead, this results in the opening of the active switch on the secondary side of the affected output only. Therefore, all other outputs will continue to function and provide fully regulated voltages to their loads.

Practical implementation requires the power to be supplied to the IC feedback regulation circuits 44A and 44B on both the primary side and secondary side of the isolation transformer T. This, however, can be accomplished easily by rectifying either the voltage on the primary side or secondary side of the isolation transformer or scaling them appropriately from the regulated input voltage through additional transformer windings. Thus, no separate housekeeping power supplies are needed and absence of the need for isolation in the control and drive circuitry is also preserved.

The elimination of any need for an isolation transformer in the regulating feedback circuits is one of the major advantages of the present invention. This has been implemented by use of independent regulating feedback IC chips commercially available, such as the Unitrode UC 3843, for example, one on the input side of the isolation transformer T and one for each separately regulated voltage output on the secondary side. This poses the need for the clocks needed in the PWM IC regulator chips on each side of the transformer T to be synchronized for proper operation. The input IC regulator chip provides a squarewave-like waveform to the transformer T that is then inductively coupled into the secondary winding of the transformer T. By differentiating this waveform via the Rs, Cs differentiator and gating only positive pulses via diode Ds into the sync input of the secondary side IC regulator chip as described hereinbefore, the two IC chips will be synchronized with respect to the input MOSFET transistor switch Q as shown in FIG. 15. The commercial IC regulators, such as the Unitrode UC 3843, provide a sync input pin for accomplishing this synchronization of the secondary side IC chip clock to the primary side IC clock so that even the clock signal, such as a 20 kHz clock, required by the IC chips may be provided by separate clock pulse sources. Thus, synchronous clock pulses are provided on both sides of the isolation barrier (transformer T) without the need of any further isolation transformer.

Figure 16:
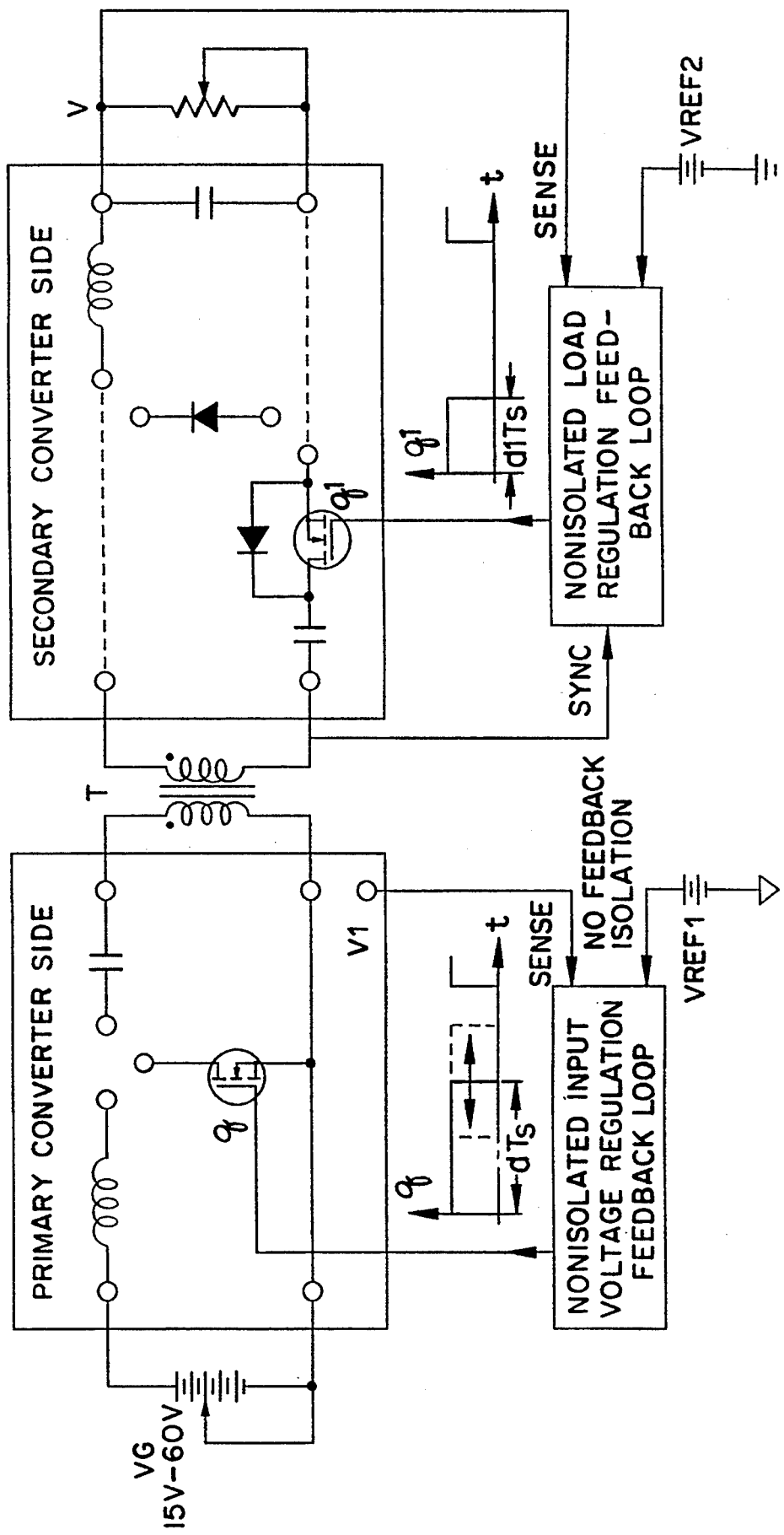
FIG. 16 is a general structure of the present invention switching converter based on capacitive energy transfer and capacitive idling. The addition of a current bidirectional switch in series with secondary-side energy transfer capacitance leads to secondary-side feedback control circuit. By sensing the OFF voltage of the primary-side active switch, the primary-side feedback loop can be closed.
Figure 17A:
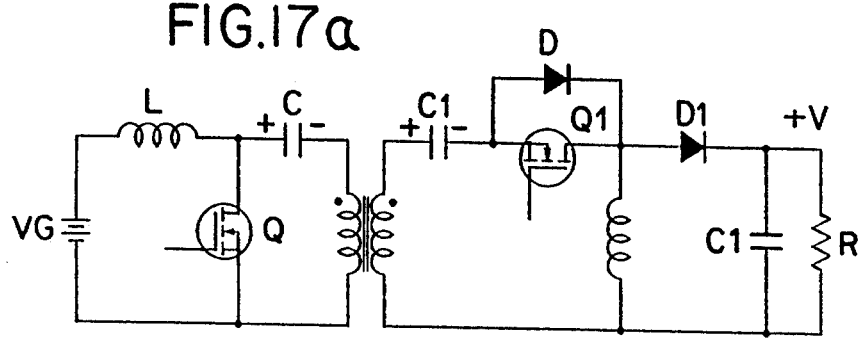
FIGS. 17a, 17b, 17c and 17d illustrates a number of converters which can be derived using the general principle outlined in FIG. 16.
Figure 17B:
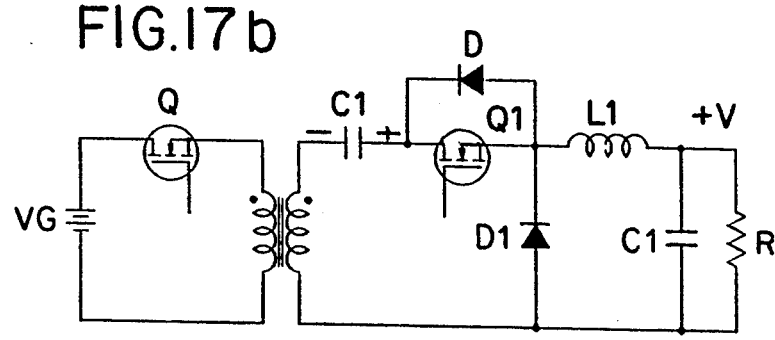
Figure 17C:
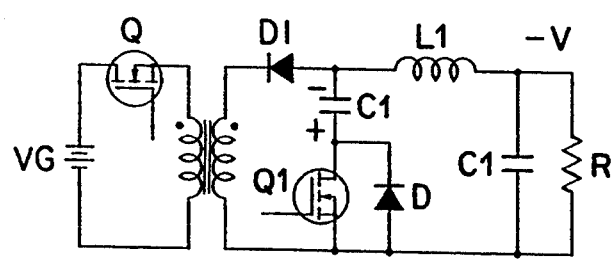
Figure 17D:
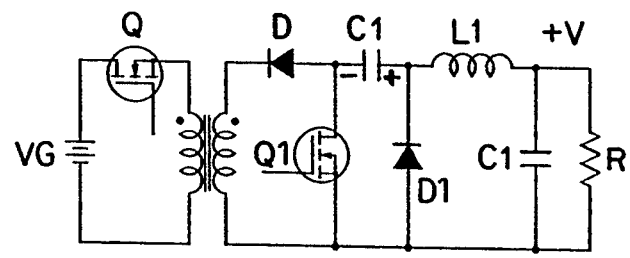

From the foregoing description, the general class of the converters with decoupled primary and secondary side feedback loops emerges as in FIG. 16. The very limited group of the converters which are characterized by the capacitive energy transfer, such as Ćuk converter, SEPIC (single ended primary inductance converter), inverse SEPIC, etc., can be first modified into their capacitive idling counterpart by addition of a switch in series with the energy transferring capacitor on the secondary side of the isolation transformer T. The secondary-side feedback loop is then controlling this switch to regulate the output voltage against load current changes only. A separate nonisolated feedback on the primary side controls the active device on the primary side and regulate against input voltage variations. The OFF voltage of the active device is used as a feedback sensing voltage. A number of converters shown in FIGS. 17a through 17d illustrate the implementation of this general concept. Note also that the converters in FIGS. 17a and 17b can also be made with the realizations equivalent to the switch implementation shown in FIG. 8.

Figure 7:
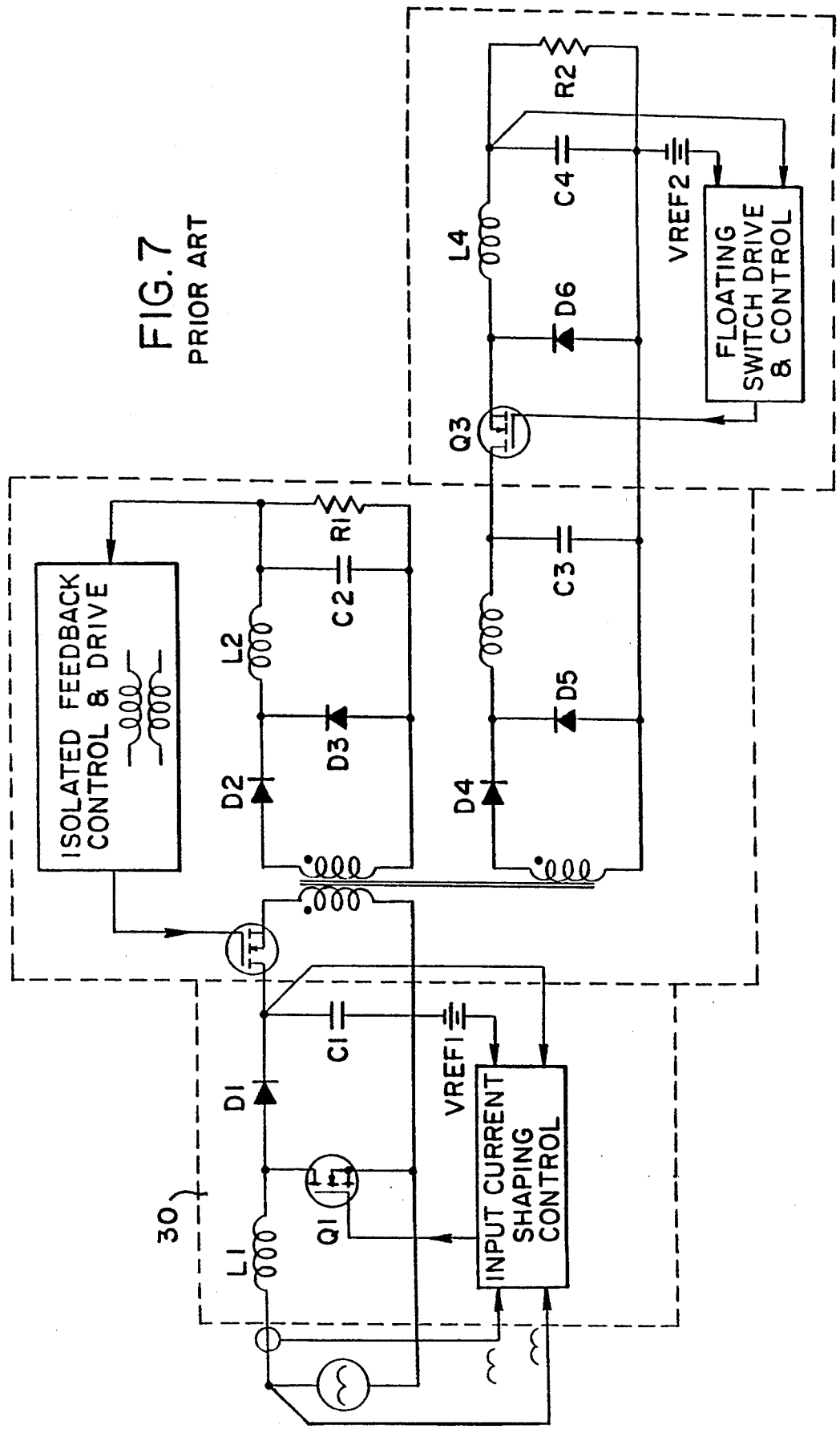
FIG. 7 is a prior art approach to provide unity power factor input in off-line converter applications: up to three separate cascaded power conversion stages are needed to provide regulation of all output stages.
Figure 18:
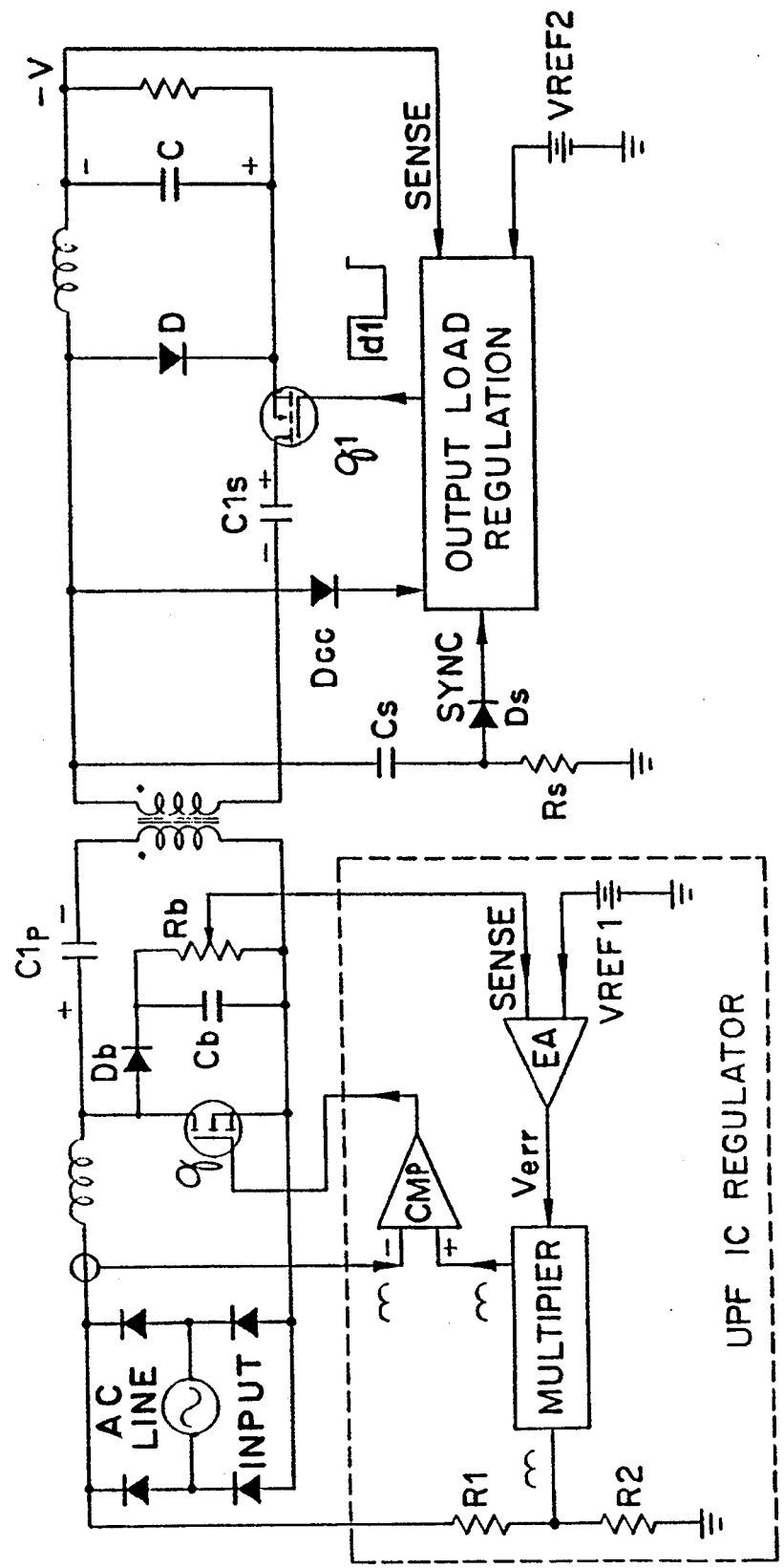
FIG. 18 is a circuit diagram of the present invention as applied to full-wave rectified ac line input: input feedback control is modified to make the average input current follow rectified ac voltage and obtain unity power factor performance.

Another very important variant of the present invention is illustrated in FIG. 18. Note that the only change from FIG. 14 is in the different feedback control algorithm which now forces the average input current to follow the rectified input voltage using standard commercially available IC regulated chips for UPF control as illustrated in FIG. 18. Thus, ideally desirable unity power factor performance is obtained for converters operating directly from a utility ac line. Note that this performance feature was obtained without addition of any power processing stages, such as the boost stage 20 in FIG. 7, thus preserving the single power processing feature, high efficiency and low cost of the original capacitive idling Ćuk converter.

Figure 19:
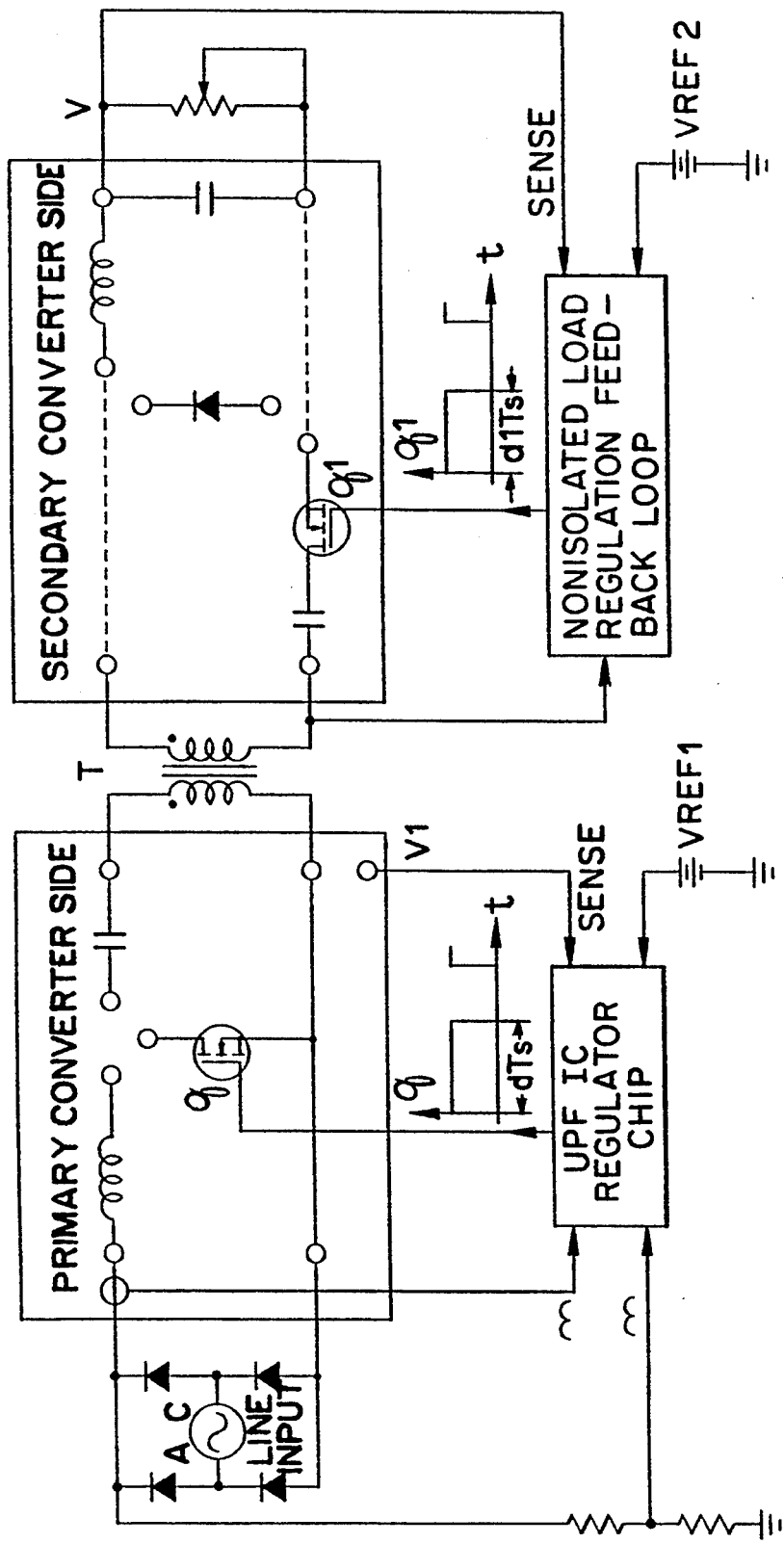
FIG. 19 is a general structure of the present invention of FIG. 18 unity power factor performance on input and fast transient response on all outputs is obtained in a single power converter.

The general concept of converters having unity power factor operation and wide bandwidth output is illustrated in FIG. 19. All converters shown earlier in FIGS. 17a through 17d are also capable of unity power factor operation with appropriate input control circuits. In all cases, isolation is provided by a transformer T with no need for transformer or other feedback isolation.

Figure 3A:
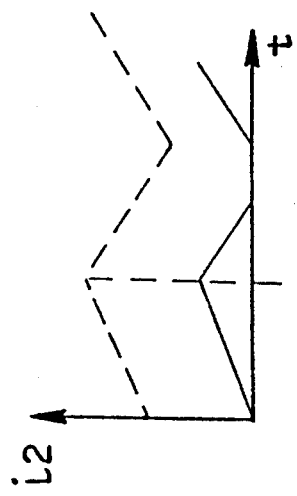
FIG. 3 is a conventional two-output forward converter with a single feedback control circuit. A light load on the unregulated output (FIG. 3a) increases its voltage despite the same duty ratio in the regulated output (FIG. 3b).
Figure 3B:
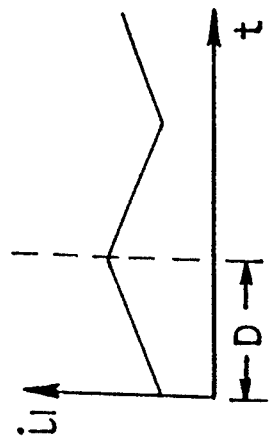
Figure 3:
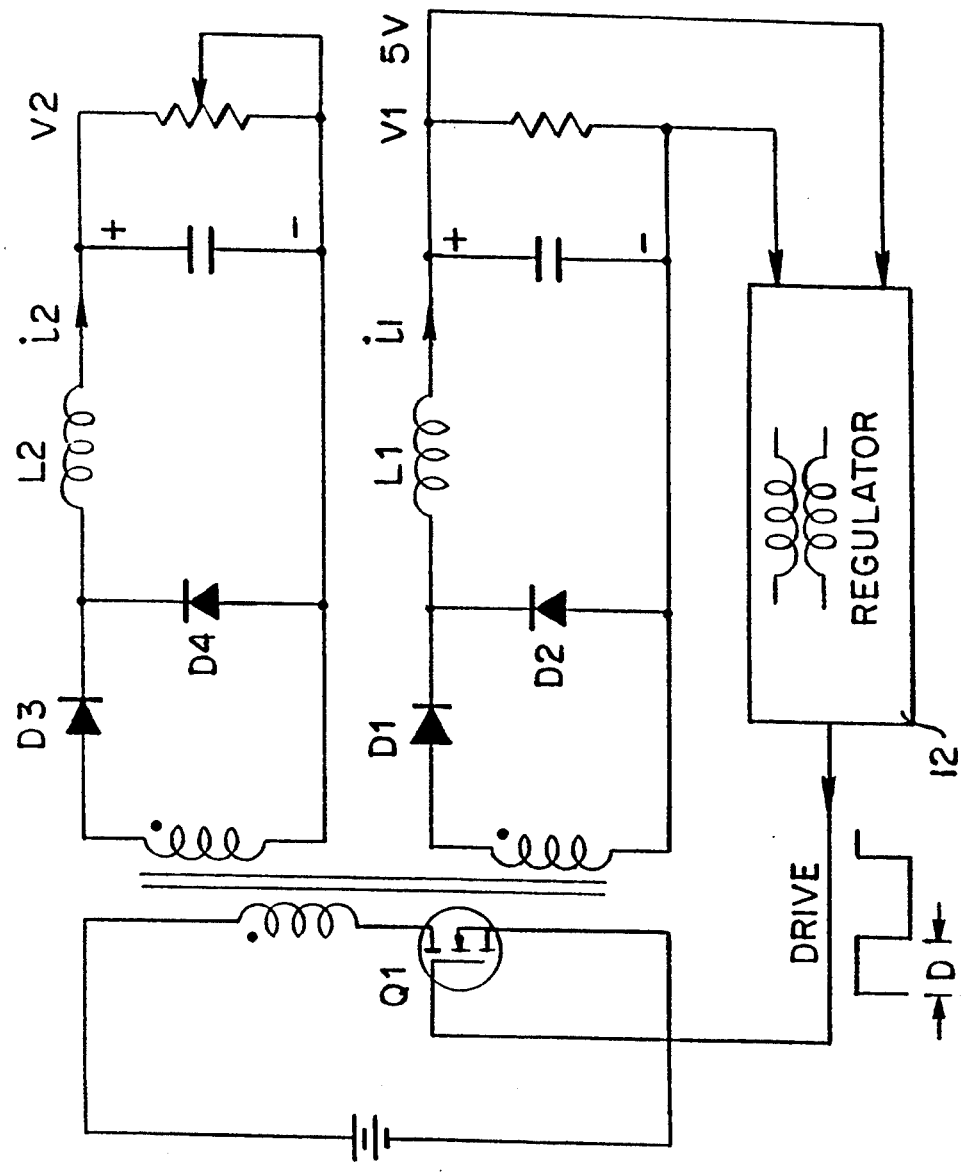
Figure 4:
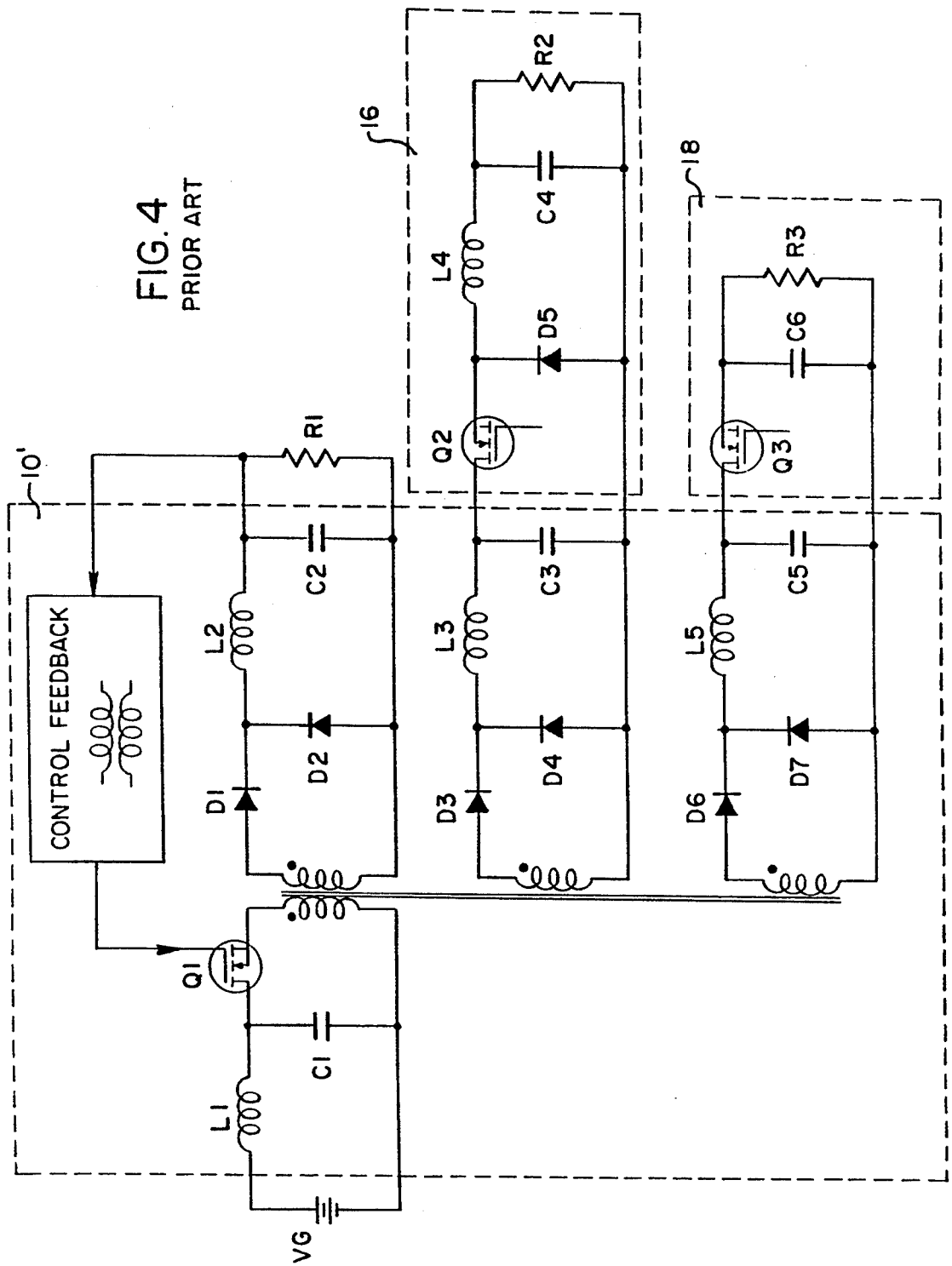
FIG. 4 illustrates that two cascaded power conversion stages are needed to achieve full voltage regulation of each output in the conventional multiple output converters.
Figure 5:
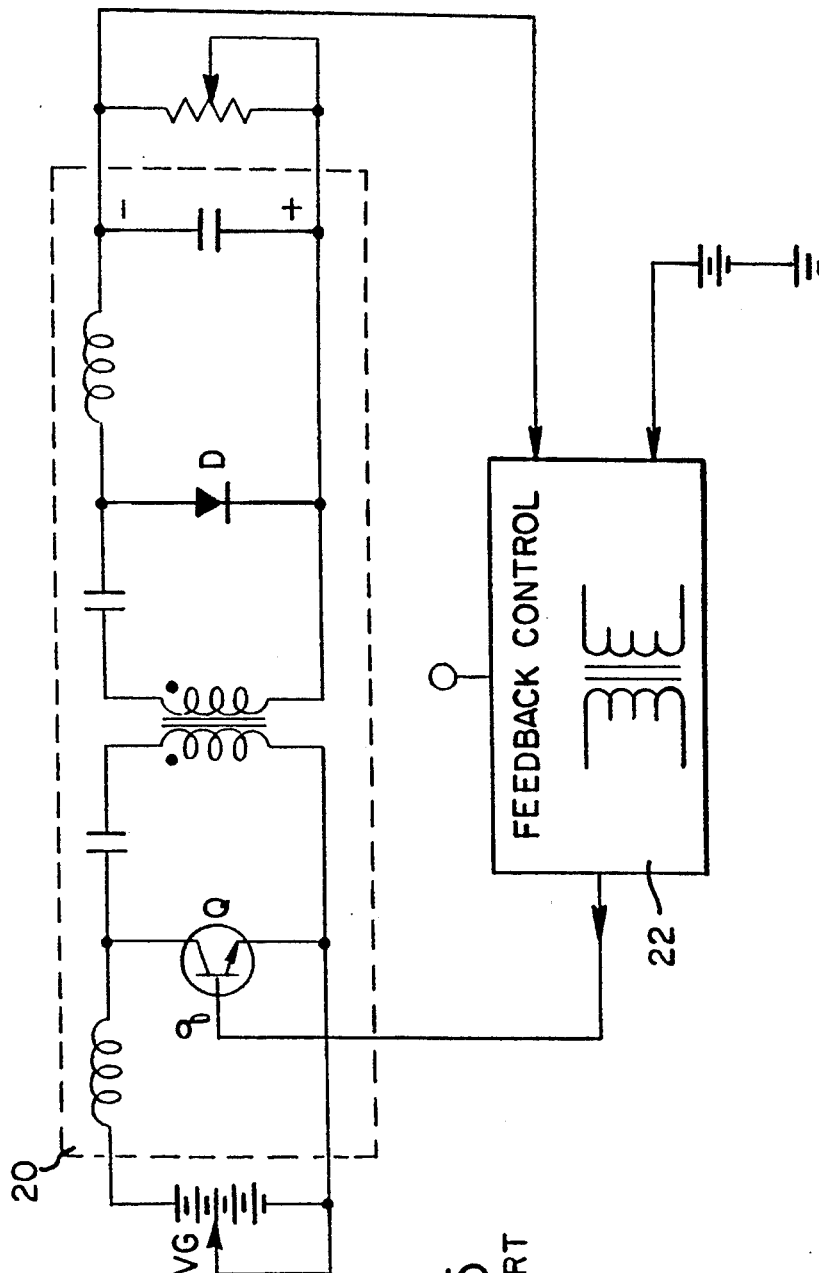
FIG. 5 is a prior-art isolated Ćuk converter employing a conventional single isolated feedback control circuit.
Figure 5A:
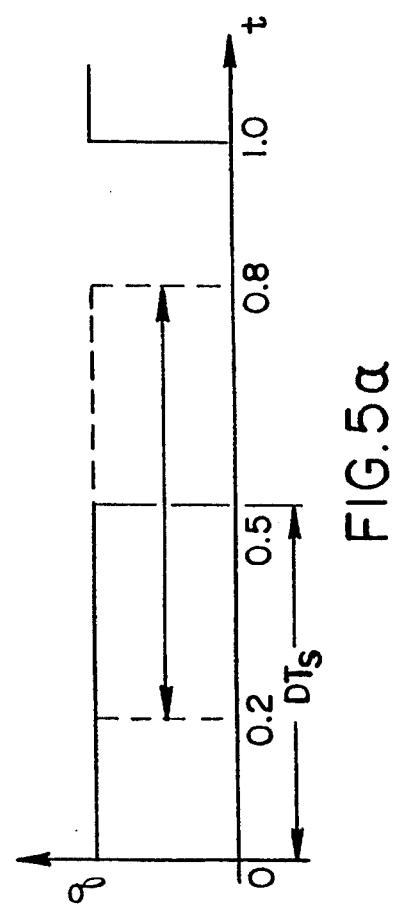

Finally, the separation of the ordinary isolated feedback control into two separate nonisolated feedback controls is made possible only in a very few special converter configurations disclosed by the present invention. Complete decoupling of the two feedback loops results in the greatly improved transient response to the step-load current change. Modern electronic loads pose severe limitations on the converter step-load response due to ever faster changing load currents. Several factors contribute to the very limited, low bandwidth of the conventional feedback control as illustrated in FIG. 5. Typical frequency response of the fourth-order Ćuk converter exhibits in addition to the four poles, the undesirable right half-plane zeros, which quickly result in a $-540°$ phase shift. This imposes very severe limitation on the bandwidth, since loop-gain has to be closed at relatively low frequencies to prevent the phase shift exceeding the stability limit of $180°$. Further limiting bandwidth is the fact that duty ratio of the active switch is used to regulate the output voltage against both input voltage and load current changes. This will cause the duty ratio to vary over wide range (typical 15 V to 60 V change may result in a 3 to 1 change of duty ratio). Moreover, the low-frequency gain and the position of both poles and zeros of the converter are highly dependent on the duty ratio, that is converter operating point. Consequently, the crossover of the converter loop-gain has to be chosen very conservatively in order to meet the worst case condition. This practically means that for the converter switching at 150 kHz, the highest bandwidth which might be expected is around 1 kHz.

Figure 20A:
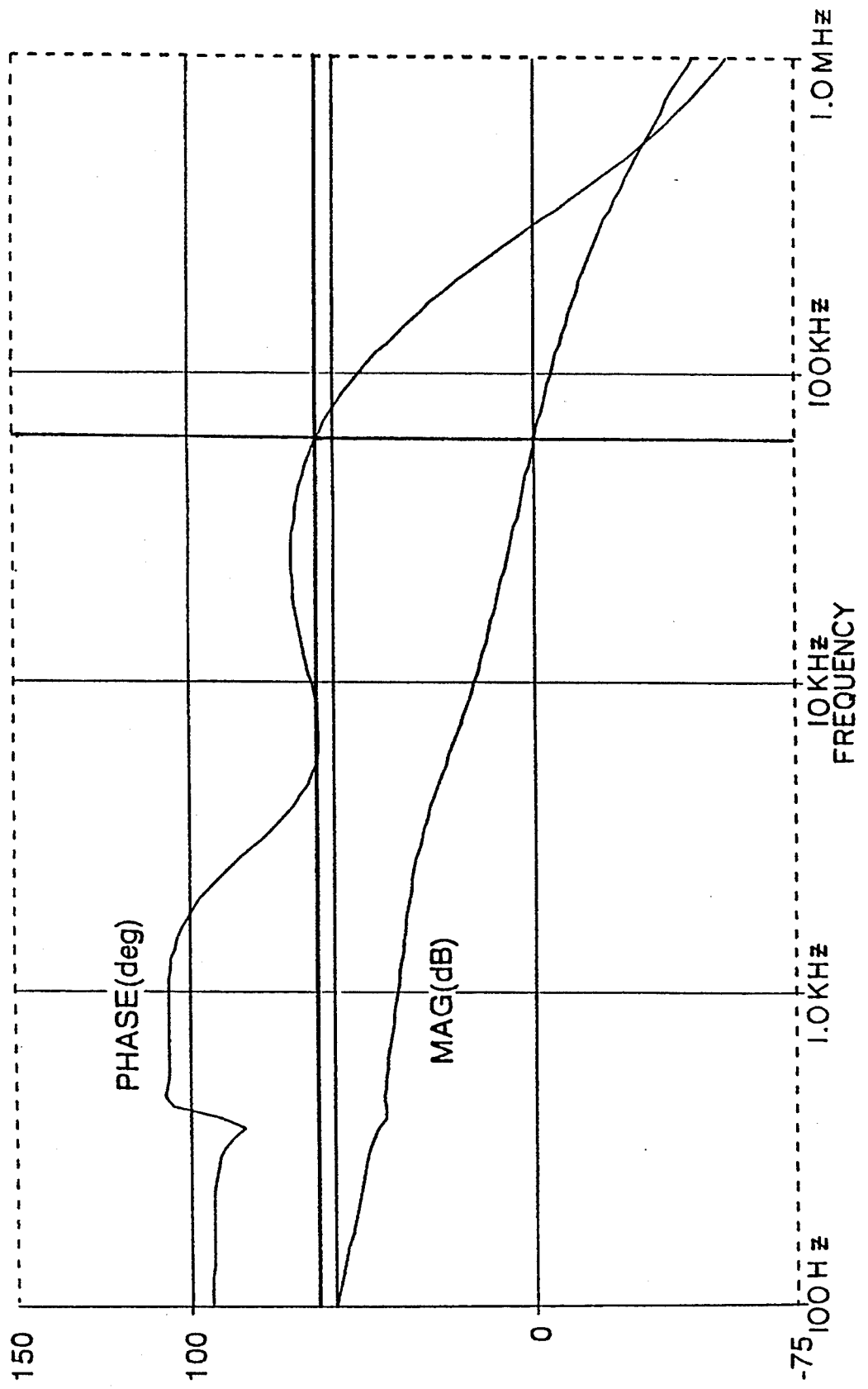
FIG. 20a shows simulation results of the load regulation loop frequency response and FIG. 20b shows simulation results of the step load transient response of the present invention, namely a capacitive idling Ćuk converter.
Figure 20B:
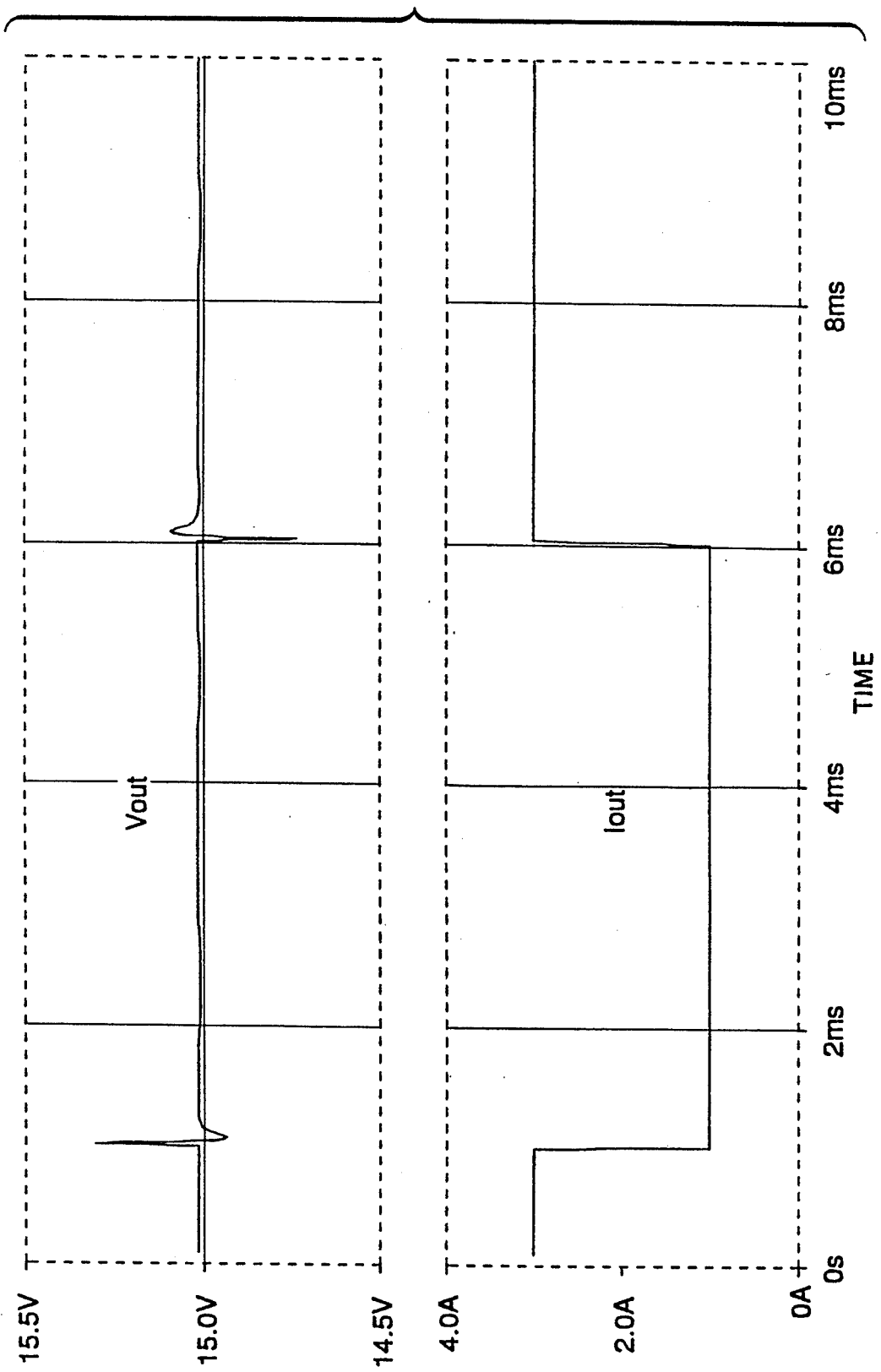
Figure 21A:
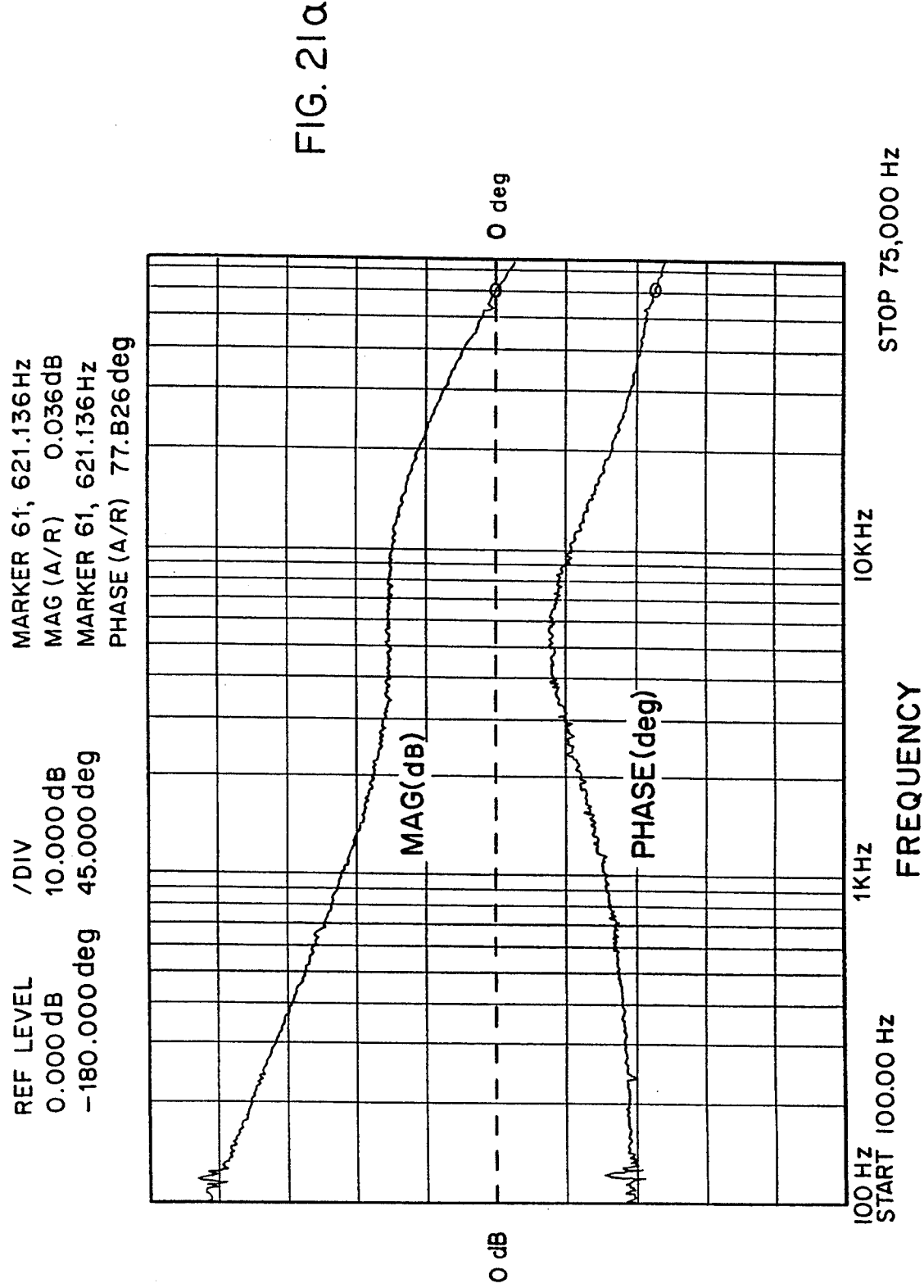
FIGS. 21a and 21b are graphs of data for the experimental prototype of the present invention switching at 150 kHz exhibits a superior 60kHz output loop bandwidth (FIG. 21a) under all operating conditions which results in the fast transient response (FIG. 21b).
Figure 21B:
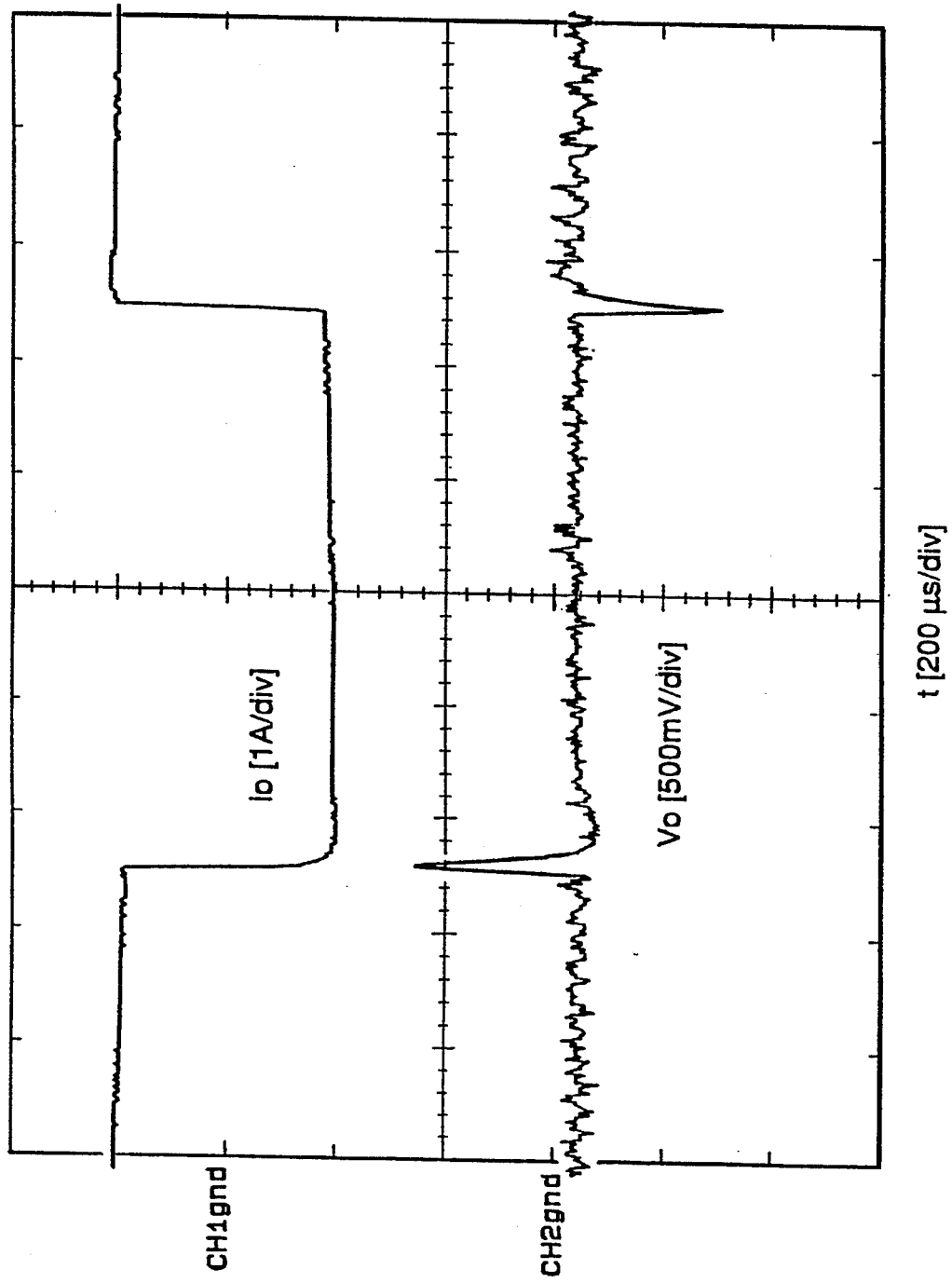

The decoupled feedback control in the capacitive idling Ćuk converter effectively reduces the output load current transients to the well-behaved second order system of the buck converter type which is free from undesirable nonminimum phase response and, in fact, does not have any zeros in the control transfer function. Note also that the operating point of the output feedback loop is fixed thanks to the action of the primary-side feedback loop which provides a fixed and preregulated input voltage to secondary side. To verify the much improved transient response, the simulation of the step-load transient response and measurements on the prototype of the capacitive idling Ćuk converter with decoupled feedbacks were made. SPICE program simulation of the load regulation loop with the lossless damping network confirms the analytically predicted bandwidth of 60 kHz as shown in FIG. 20a. Since the input voltage to the buck-like output stage is constant, its frequency response is unchanged for all load current and input voltage combinations and its loop-gain crossover constant at 60 kHz. This wide bandwidth guarantees an excellent transient response. Simulation of the transient response to 1A to 3A step-load current change are shown in FIG. 20b. The output voltage overshoot is excellent (2%). Similarly impressive performance was obtained on the experimental prototype circuit with the measurement results shown in FIG. 21a and 21b. This should be compared to the original 1 kHz bandwidth which could be obtained for the isolated Ćuk converter of FIG. 5, thus a factor of 60 times improvement in the bandwidth. Furthermore, this is obtained by an increase of the output capacitance by the same factor leading to rather heavy penalty in size, weight and cost of the conventional approach.

The excellent fast output transient response is also preserved when the converter is powered directly from a full-wave rectified ac line. In fact, the UPF performance on the input is obtained simultaneously with the wide bandwidth output feedback loop in a single power conversion stage of the capacitive idling isolated Ćuk converter with decoupled nonisolated feedbacks.

However, although there is complete decoupling between the primary- and secondary-side feedback circuits regarding their steady-state properties, that is the output dc voltage V and intermediate dc voltage V1, the two feedback loops are still connected in cascade, thus leading to their interaction regarding the dynamic response. Thus, a potential for instability could still arise if the two feedback loops were not properly designed and their possible adverse interaction accounted for.

In summary, a novel capacitive idling Ćuk converter with decoupled feedbacks is shown to possess the following advantages over conventional converters:

1. Elimination of the need to cross the isolation barrier in the feedback control path.
2. Full regulation of multiple outputs in a single input power-processing stage.
3. Separation of the conventional isolated feedback into two independent feedback loops, namely input voltage feedback regulation and output load regulation loops, resulting in fast transient response.
4. Independent short circuit protection of each output.
5. Efficiency, cost, and size comparable to conventional multiple output converters.
6. Ideal unity power factor performance in off-line converter applications is obtained at no additional penalty in efficiency, size and cost over the standard multiple output dc-to-dc converters.

We claim:

1. In a dc-to-dc switching-mode converter having a power transformer for isolation between a primary side power stage connected to a dc voltage source and a secondary side power conversion stage connected to a load, said dc-to-dc switching mode converter having two nonisolated feedback circuits, one on the primary side and the other on the secondary side of said power transformer, which decouple output voltage regulation due to any change in said input voltage from regulation of output voltage to said load due to load current changes, thereby obviating entirely the need for any isolation in said two nonisolated feedback circuits, said primary side feedback circuit regulating against changes in input voltage from said dc voltage source by controlling pulse width modulation of a duty ratio, d, of a controllable switch in said primary side power stage, said secondary side feedback circuit regulating against load current changes by controlling pulse width modulation of a duty ratio, $d_1$, of a current bidirectional controllable switch in said secondary side power conversion stage, said primary side feedback circuit being decoupled from said secondary side feedback circuit, whereby any change to said input voltage will not affect said duty ratio, $d_1$ of said current bidirectional controllable switch of said secondary side power conversion stage, sensing means on said primary side power stage for sensing the switch-off voltage of the primary side controllable switch while it is turned off and feedback means for regulation of said switch-off voltage sensed through said primary side feedback circuit without a need for isolation in a circuit from said sensing means to said feedback means, said primary side and secondary side controllable switches being turned on simultaneously and at a constant switching frequency, and turned off under control of their respective nonisolated feedback circuits, and means for synchronously turning on said secondary side controllable switch with said primary side controllable switch without need for isolation in said synchronization means, whereby overall conversion gain A of said dc-to-dc converter is the product of two gains $A_1$ and $A_2$, where $A_1$ is dependent only on said duty ratio, d, of said primary side controllable switch, while $A_2$ is dependent only on said duty ratio, $d_1$, of said secondary side current bidirectional controllable switch.

2. In a dc-to-dc switching-mode converter as defined in claim 1 wherein said sensing means for sensing said switch-off voltage of said primary side controllable switch consists of a peak detector which senses said switch-off voltage and converts it to a dc control voltage through a rectifier, capacitor and resistive divider network.

3. In a dc-to-dc switching-mode converter as defined in claim 1, wherein said means for synchronously turning on said primary side controllable switch and said secondary side controllable switch is achieved by means for differentiating voltage on the secondary side of said transformer resulting from switching on said primary side controllable switch, thereby producing positive and negative repetitive sync pulses and gating through a diode sync pulses of only one polarity for turning on said secondary controllable switch, thereby synchronizing said secondary side controllable switch to said primary side controllable switch.

4. In a dc-to-dc switching-mode converter as defined in claim 1, a plurality of secondary side power conversion stages, each having its own separate and independent nonisolated feedback circuit for output voltage regulation.

5. In a dc-to-dc switching-mode converter as defined in claim 1 wherein said dc source of voltage comprises a full-wave rectifier connected to an ac power line for producing a rectified input line voltage and additional feedback means for forcing average input current to follow said rectified input line voltage thereby resulting in unity power factor input current.

6. In a dc-to-dc switching-mode converter as defined in claim 4 wherein said dc source of voltage comprises a full-wave rectifier connected to an ac power line for producing a rectified input line voltage and additional feedback means for forcing average input current to follow said rectified input line voltage thereby resulting in unity power factor input current.

7. In a dc-to-dc switching-mode converter as defined in claim 1 wherein said primary stage comprises in series a source of dc voltage, an input inductor, first energy transferring capacitor and the primary winding of said isolation transformer, in that order connected to a return current path to said source of dc voltage, and further having a primary side controllable switch periodically connecting the junction between said input inductor and said capacitor to said return current path, said secondary side having in series the secondary winding of said isolation transformer, said secondary side energy transfer capacitor, said secondary side current bidirectional controllable switch, an output diode and a load in that order, and further having an inductor connecting the junction of said current bidirectional controllable switch and said diode to a junction between said load and said secondary winding, and said conversion gains satisfy the decoupling criteria of claim 1 given as $A_1 = 1/(1-d)$ and $A_2 = d_1$.

8. In a dc-to-dc switching-mode converter as defined in claim 1 wherein said primary stage comprises in series a source of dc voltage, said primary side controllable switch and said primary winding, said secondary side having in series said secondary winding, a secondary-side energy transfer capacitor, said secondary side current bidirectional controllable switch, an output inductor and said load in that order, and further having passive switching means for connecting a junction of said current bidirectional controllable switch and said output inductor to a junction between said load and said secondary winding in response to the action of said current bidirectional controllable switch, and said conversion gains satisfy the decoupling criteria of claim 1 given as $A_1 = 1/(1-d)$ and $A_2 = d_1$.

9. In a dc-to-dc switching-mode converter as defined in claim 7, wherein said dc source of voltage comprises a full-wave rectifier connected to an ac power line for producing a rectified input line voltage and additional feedback means for forcing average input current to follow said rectified input line voltage thereby resulting in unity power factor input current.

10. In a dc-to-dc switching-mode converter as defined in claim 8, wherein said dc source of voltage comprises a full-wave rectifier connected to an ac power line and additional feedback means which forces the average input current to follow the rectified input line voltage from said full-wave rectifier thereby resulting in unity power factor input current.

* * * * *